US010274988B2

(12) United States Patent
Shirane et al.

(10) Patent No.: US 10,274,988 B2
(45) Date of Patent: Apr. 30, 2019

(54) INPUT/OUTPUT OPERATION DEVICE

(71) Applicant: Panasonic Intellectual Property Management Co., Ltd., Osaka (JP)

(72) Inventors: Hideki Shirane, Osaka (JP); Teruyuki Takizawa, Osaka (JP); Hironori Tomita, Nara (JP); Jiro Seki, Osaka (JP); Takeshi Nakazawa, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 99 days.

(21) Appl. No.: 15/526,583

(22) PCT Filed: Nov. 18, 2015

(86) PCT No.: PCT/JP2015/005779
§ 371 (c)(1),
(2) Date: May 12, 2017

(87) PCT Pub. No.: WO2016/079988
PCT Pub. Date: May 26, 2016

(65) Prior Publication Data
US 2017/0322586 A1 Nov. 9, 2017

(30) Foreign Application Priority Data
Nov. 19, 2014 (JP) .................. 2014-234848

(51) Int. Cl.
*G05G 9/047* (2006.01)
*G05G 5/03* (2008.04)
(Continued)

(52) U.S. Cl.
CPC .............. *G05G 9/047* (2013.01); *G05G 5/03* (2013.01); *G05G 25/00* (2013.01); *G06F 3/016* (2013.01);
(Continued)

(58) Field of Classification Search
CPC .......... G05G 2009/04766; G05G 2009/04781; G05G 25/00; G05G 5/03; G05G 9/047;
(Continued)

(56) References Cited

U.S. PATENT DOCUMENTS

2003/0080939 A1* 5/2003 Kobayashi ............. G05G 9/047
345/156
2005/0007342 A1* 1/2005 Cruz-Hernandez ..........................
B06B 1/0603
345/161

(Continued)

FOREIGN PATENT DOCUMENTS

JP 2003-140757 A 5/2003

OTHER PUBLICATIONS

International Search Report for corresponding International Application No. PCT/JP2015/005779 dated Jan. 26, 2016.

Primary Examiner — Tony O Davis
(74) Attorney, Agent, or Firm — Renner Otto Boisselle & Sklar, LLP

(57) ABSTRACT

Provided is an input/output operation device including: an operation unit, which is operated by an operator; a detection unit, which detects a position of the operation unit to generate a position signal corresponding to the position of the operation unit; a control circuit, which receives the position signal to generate a speed control signal; and a drive circuit, which receives the speed control signal to drive the operation unit, in which the control circuit: (a) causes the position signal to pass through a first filter circuit to generate a speed signal; (b) causes the position signal to pass through a second filter circuit, which has a frequency transmission characteristic that is different from that of the first filter circuit, to generate a correction signal; and (c) adds at least (Continued)

the speed signal and the correction signal together to generate the speed control signal.

20 Claims, 38 Drawing Sheets

(51) Int. Cl.
    *G05G 25/00*      (2006.01)
    *G06F 3/01*      (2006.01)
    *G06F 3/0354*      (2013.01)
    *G06F 3/0481*      (2013.01)
    *G06F 3/03*      (2006.01)

(52) U.S. Cl.
    CPC ............ *G06F 3/03* (2013.01); *G06F 3/03549* (2013.01); *G06F 3/04812* (2013.01); *G05G 2009/04766* (2013.01); *G05G 2009/04781* (2013.01)

(58) Field of Classification Search
    CPC ........ G06F 3/016; G06F 3/03; G06F 3/03549; G06F 3/04812
    USPC .......................................................... 345/156
    See application file for complete search history.

(56) References Cited

U.S. PATENT DOCUMENTS

| | | | |
|---|---|---|---|
| 2005/0134561 A1* | 6/2005 | Tierling | G06F 3/016 345/156 |
| 2006/0274035 A1* | 12/2006 | Bailey | G06F 3/016 345/156 |
| 2007/0091063 A1* | 4/2007 | Nakamura | G06F 3/016 345/156 |
| 2007/0236450 A1* | 10/2007 | Colgate | G06F 3/016 345/156 |
| 2007/0285216 A1* | 12/2007 | Tierling | A63F 13/06 340/407.1 |
| 2017/0003789 A1* | 1/2017 | Woolley | G06F 3/016 |
| 2017/0269692 A1* | 9/2017 | Eck | G06F 3/016 |

* cited by examiner

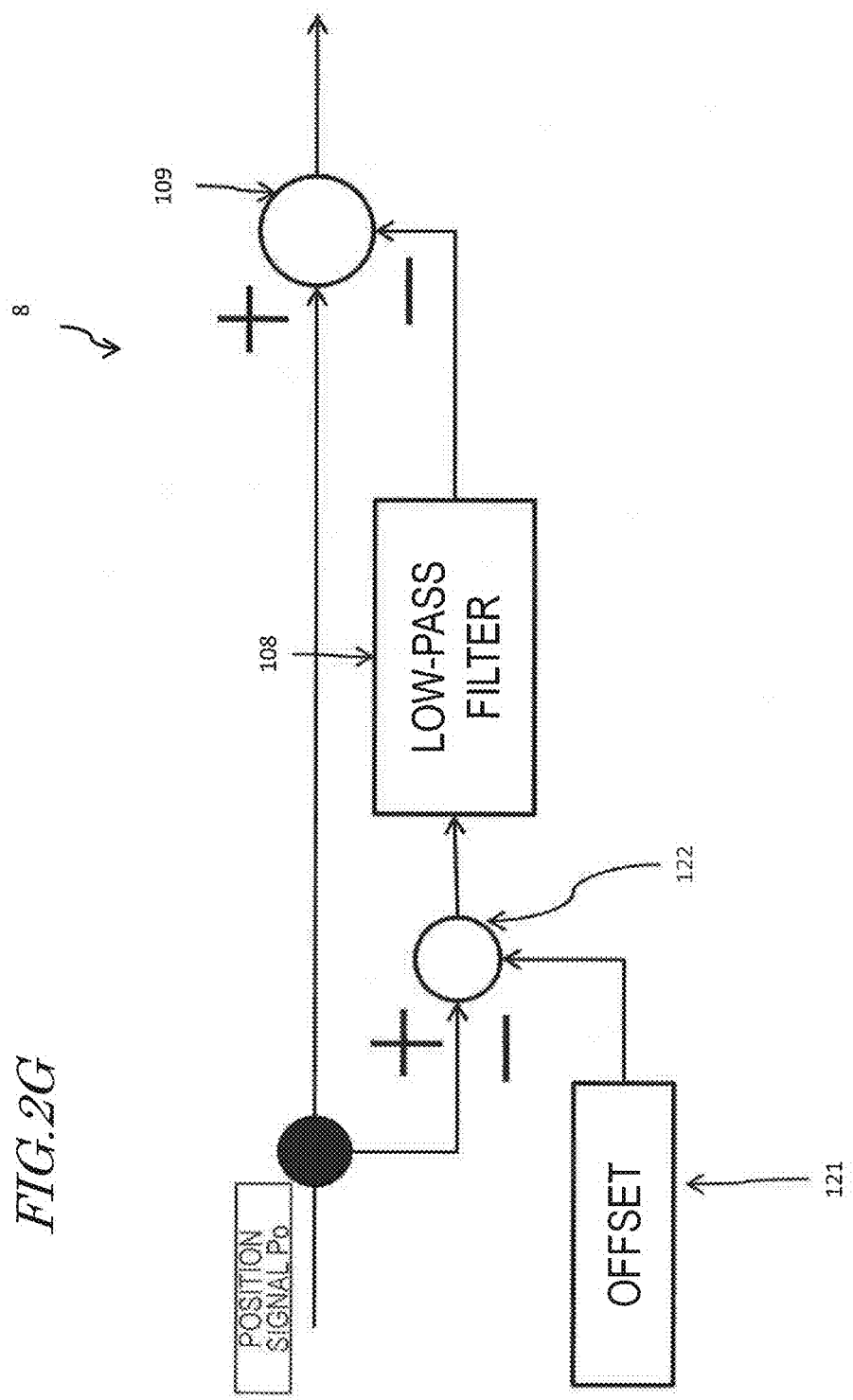

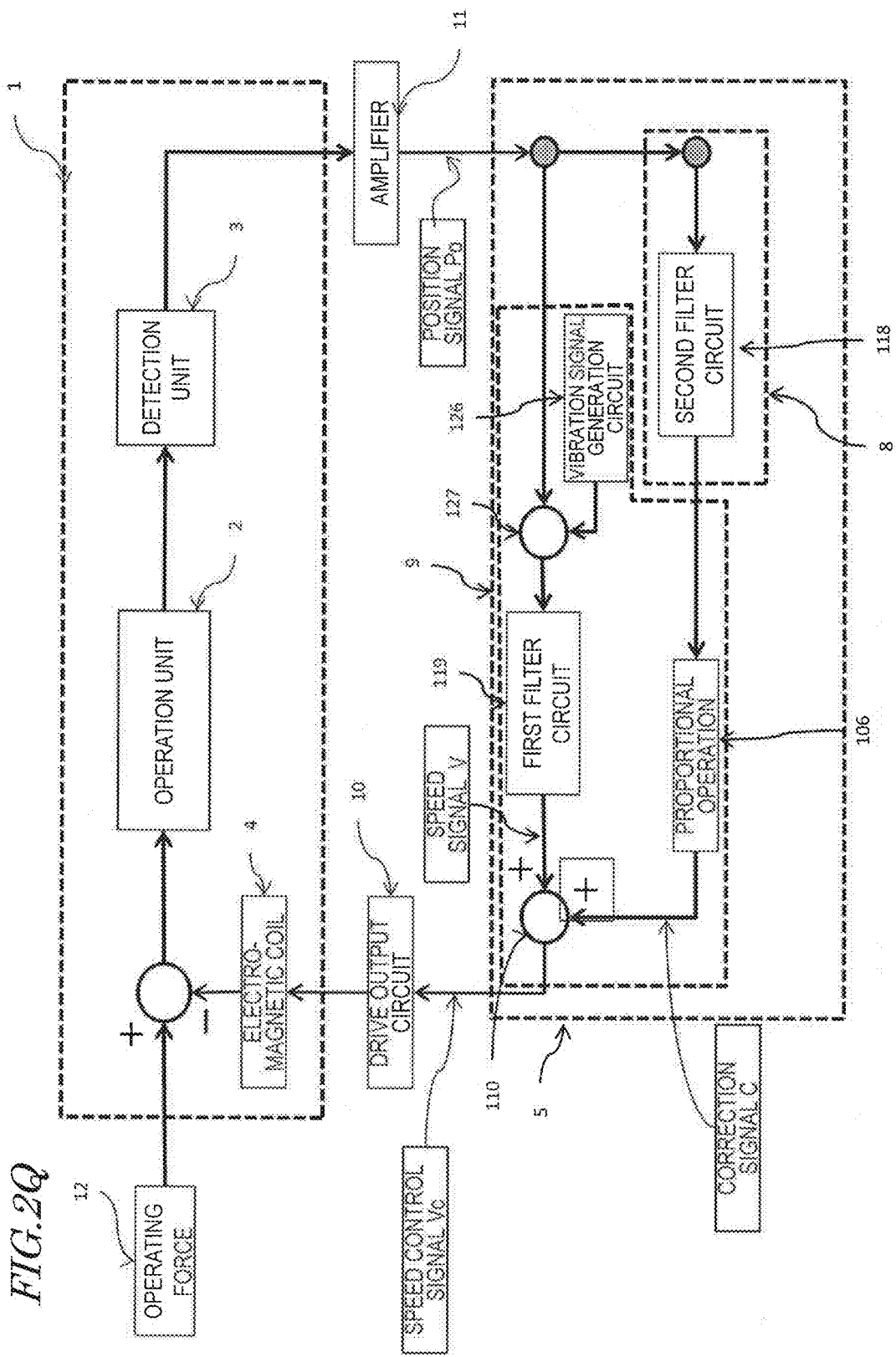

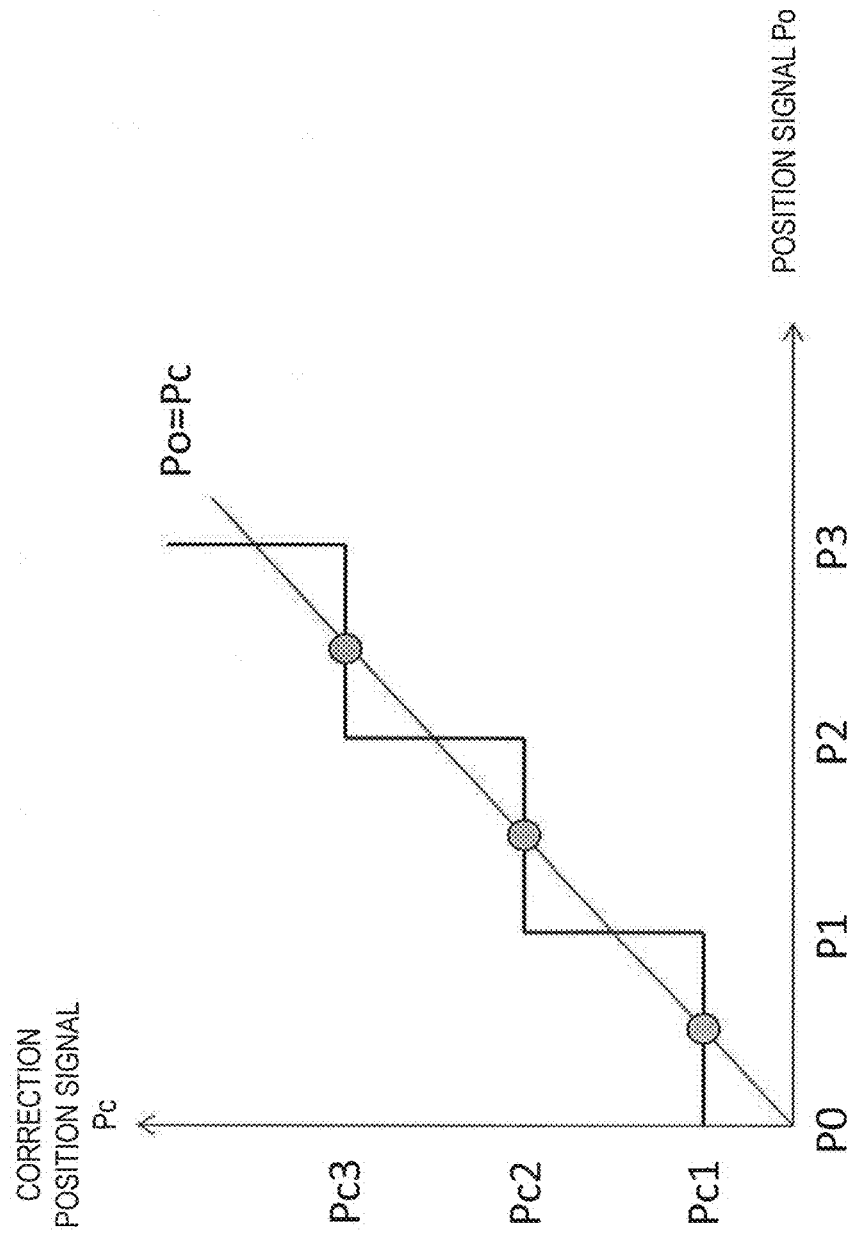

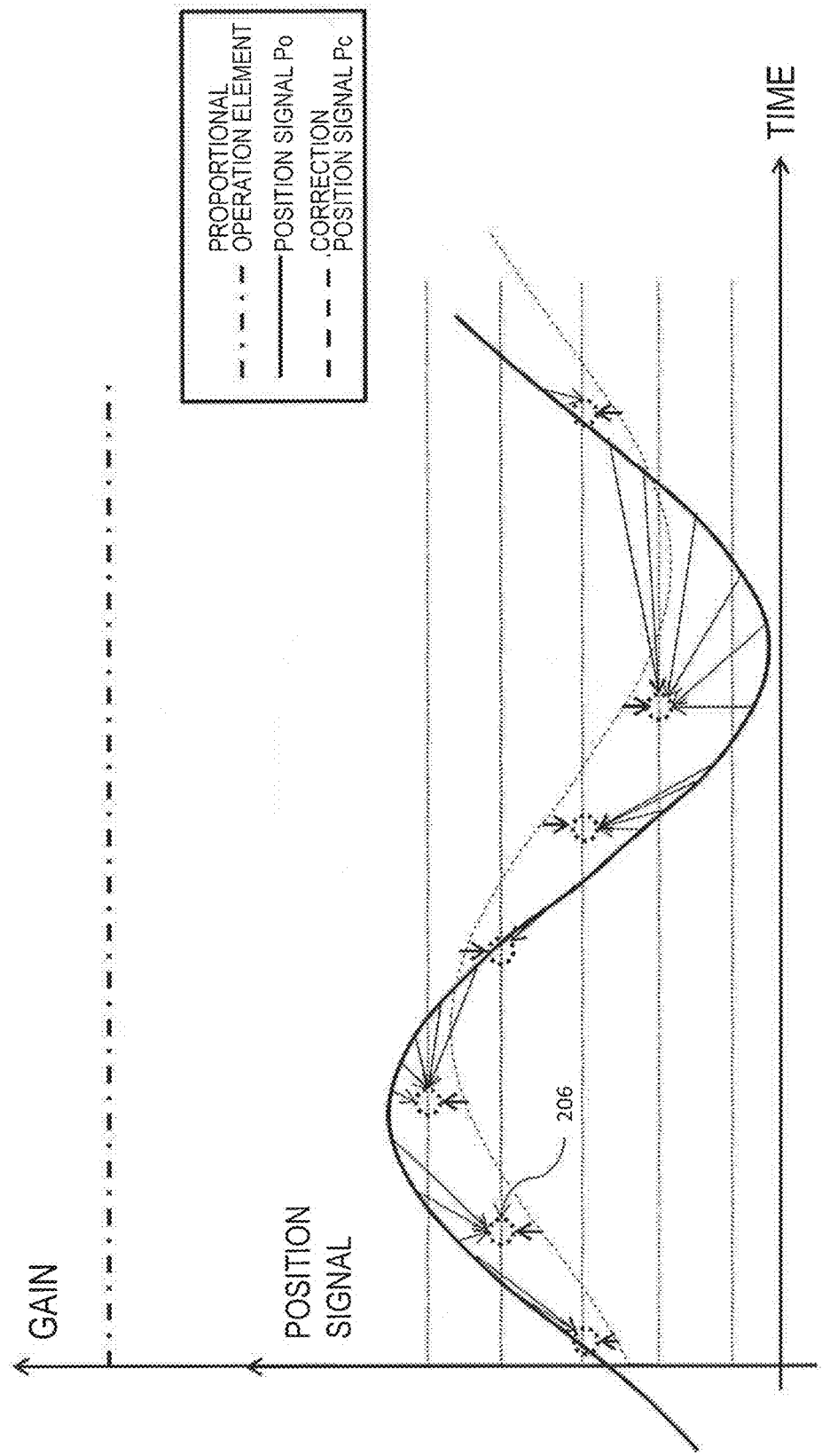

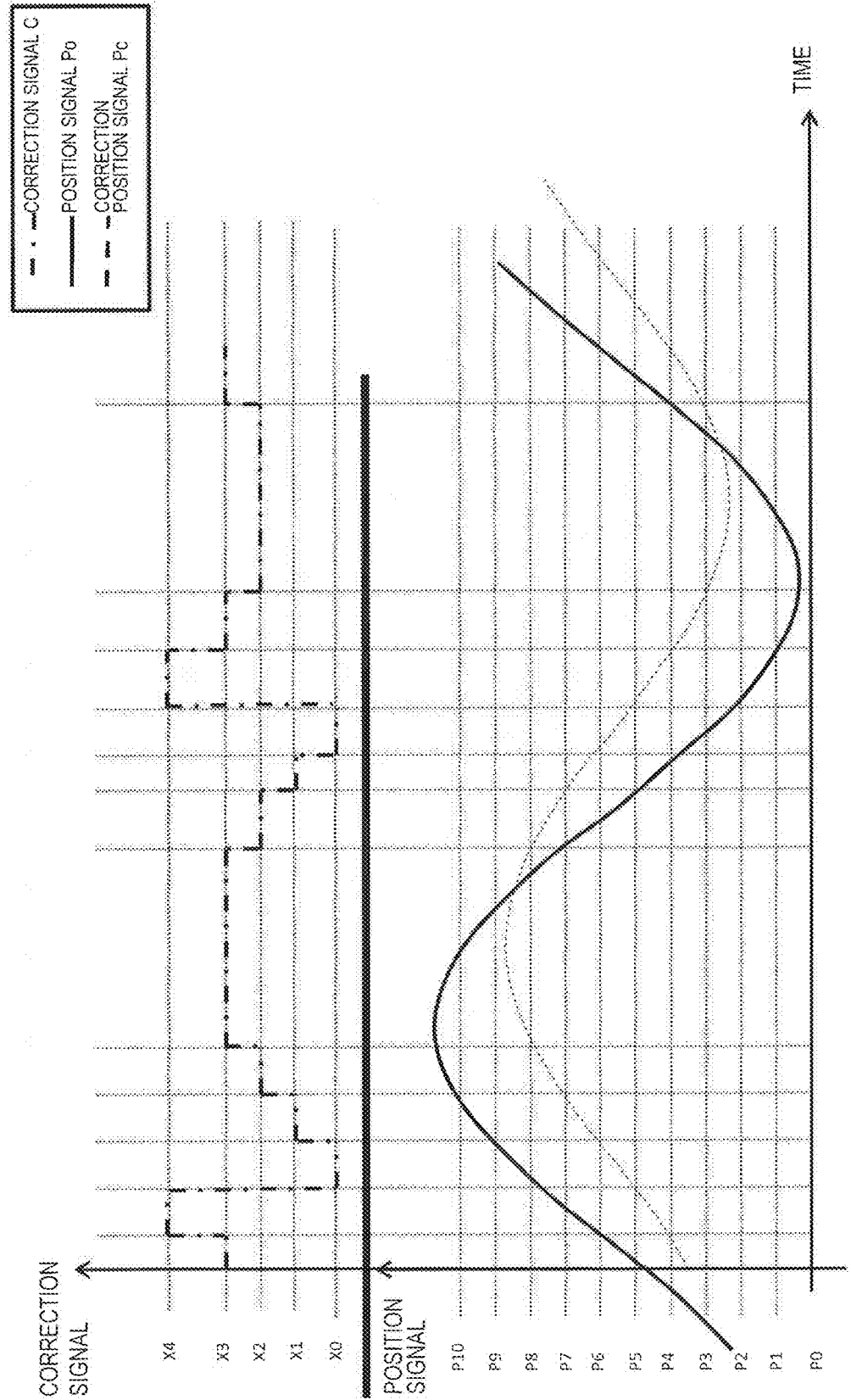

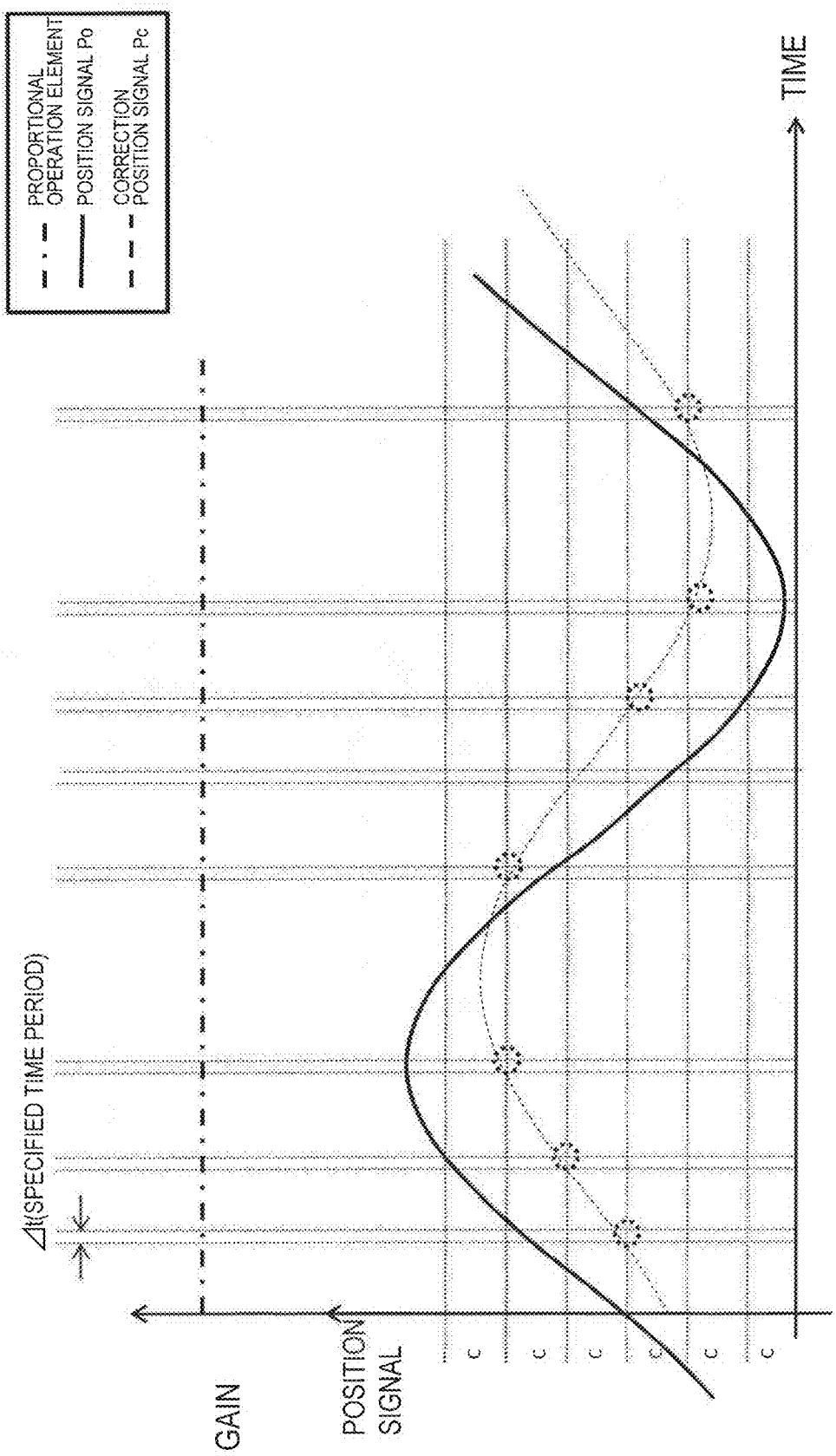

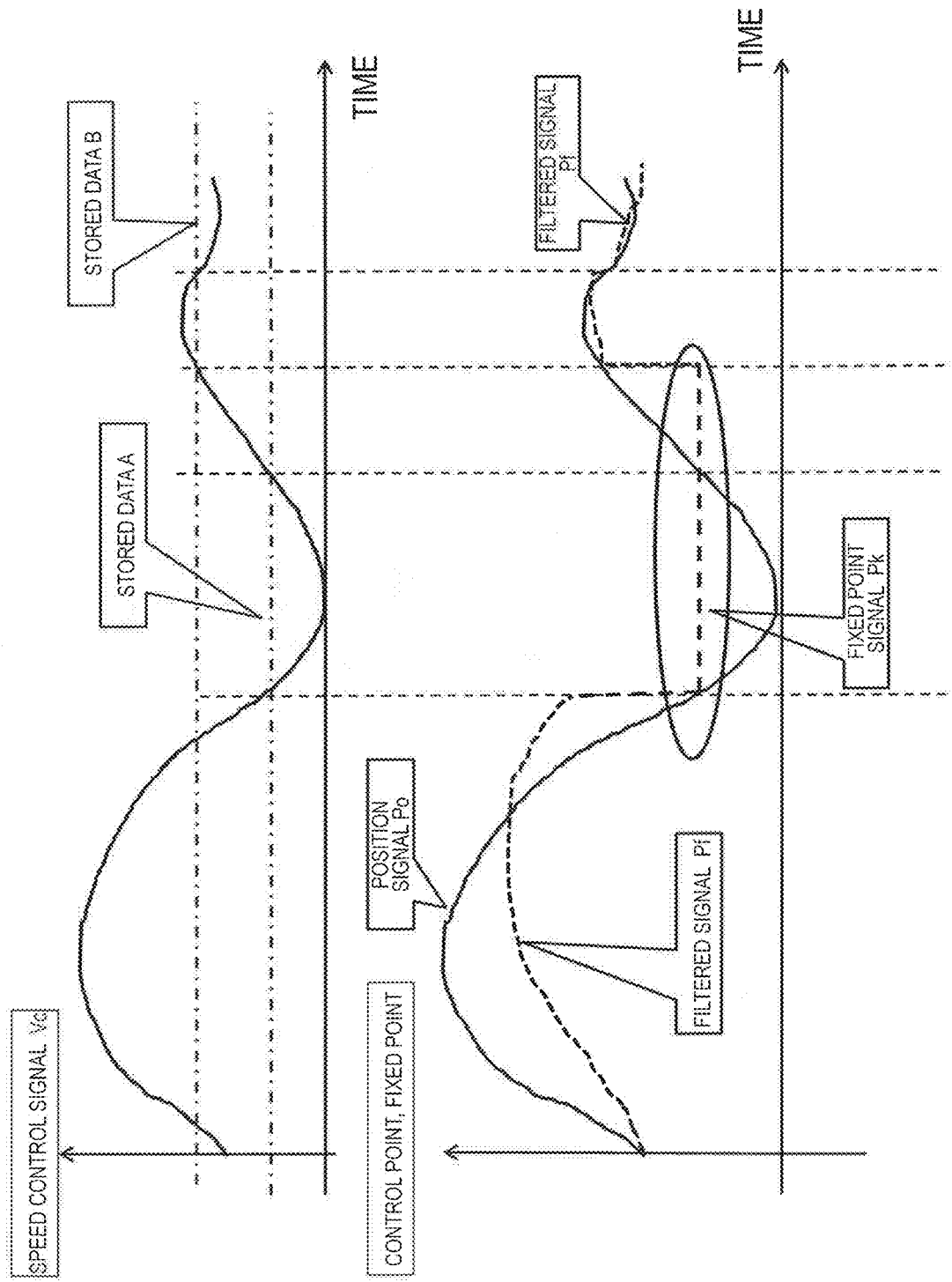

INPUT/OUTPUT OPERATION DEVICE

TECHNICAL FIELD

This application relates to an input/output operation device.

BACKGROUND ART

In recent years, in a variety of fields, in order to improve operability of an operator who controls equipment, there has been developed an input/output operation device configured to apply a tactile sensation corresponding to an operation. The term "input" as used herein means an instruction issued by the operator to control the equipment, and the term "output" as used herein means the tactile sensation presented to the operator. The tactile sensation presented to the operator is also called "haptic perception". For example, in Patent Document No. 1, there is disclosed a small-sized and low-priced haptic input apparatus having an operation feeling imparting function, which is equipped with a lever handle.

CITATION LIST

Patent Literature

Patent Document No. 1: Japanese Patent Application Laid-Open Publication No. 2003-140757

SUMMARY OF INVENTION

Technical Problem

The related-art input apparatus has been required to provide a more natural tactile sensation. Non-limiting exemplary embodiments of this application provide an input/output operation device with high operability.

Solution to Problem

An input/output operation device according to one embodiment of this disclosure includes: an operation unit, which is operated by an operator; a detection unit, which is configured to detect a position of the operation unit to generate a position signal corresponding to the position of the operation unit; a control circuit, which is configured to receive the position signal to generate a speed control signal; and a drive circuit, which is configured to receive the speed control signal to drive the operation unit, in which the control circuit is configured to: (a) cause the position signal to pass through a first filter circuit to generate a speed signal; (b) cause the position signal to pass through a second filter circuit, which has a frequency transmission characteristic that is different from a frequency transmission characteristic of the first filter circuit, to generate a correction signal; and (c) add at least the speed signal and the correction signal together to generate the speed control signal.

Advantageous Effects of Invention

According to the input/output operation device of this disclosure, a tactile sensation that is superior to that of the related art can be presented.

BRIEF DESCRIPTION OF DRAWINGS

FIG. 2G is a diagram for illustrating still another configuration example of the second filter circuit of the input/output operation device according to the first embodiment.

FIG. 2I is a diagram for illustrating yet another configuration example of the second filter circuit of the input/output operation device according to the first embodiment.

FIG. 2O is a diagram for illustrating yet another specific configuration example of the input/output operation device according to the first embodiment.

FIG. 2Q is a diagram for illustrating yet another specific configuration example of the input/output operation device according to the first embodiment.

FIG. 3C is a graph for schematically showing a position signal Po and a correction position signal Pc in the input/output operation device illustrated in FIG. 3B.

FIG. 3D is a graph for showing the position signal Po, a filtered position signal Pf, and the correction position signal Pc in the input/output operation device illustrated in FIG. 3B.

FIG. 4D is a graph for showing the position signal Po, the correction position signal Pc, and a correction signal C in the input/output operation device illustrated in FIG. 4B.

FIG. 5D is a graph for showing the position signal Po, the correction position signal Pc, and a correction signal C in the input/output operation device illustrated in FIG. 5B.

FIG. 6B is a graph for schematically showing a speed signal Vc and two signals input to a subtractor of a position computation block in the input/output operation device illustrated in FIG. 6A.

DESCRIPTION OF EMBODIMENTS

Figure 1:
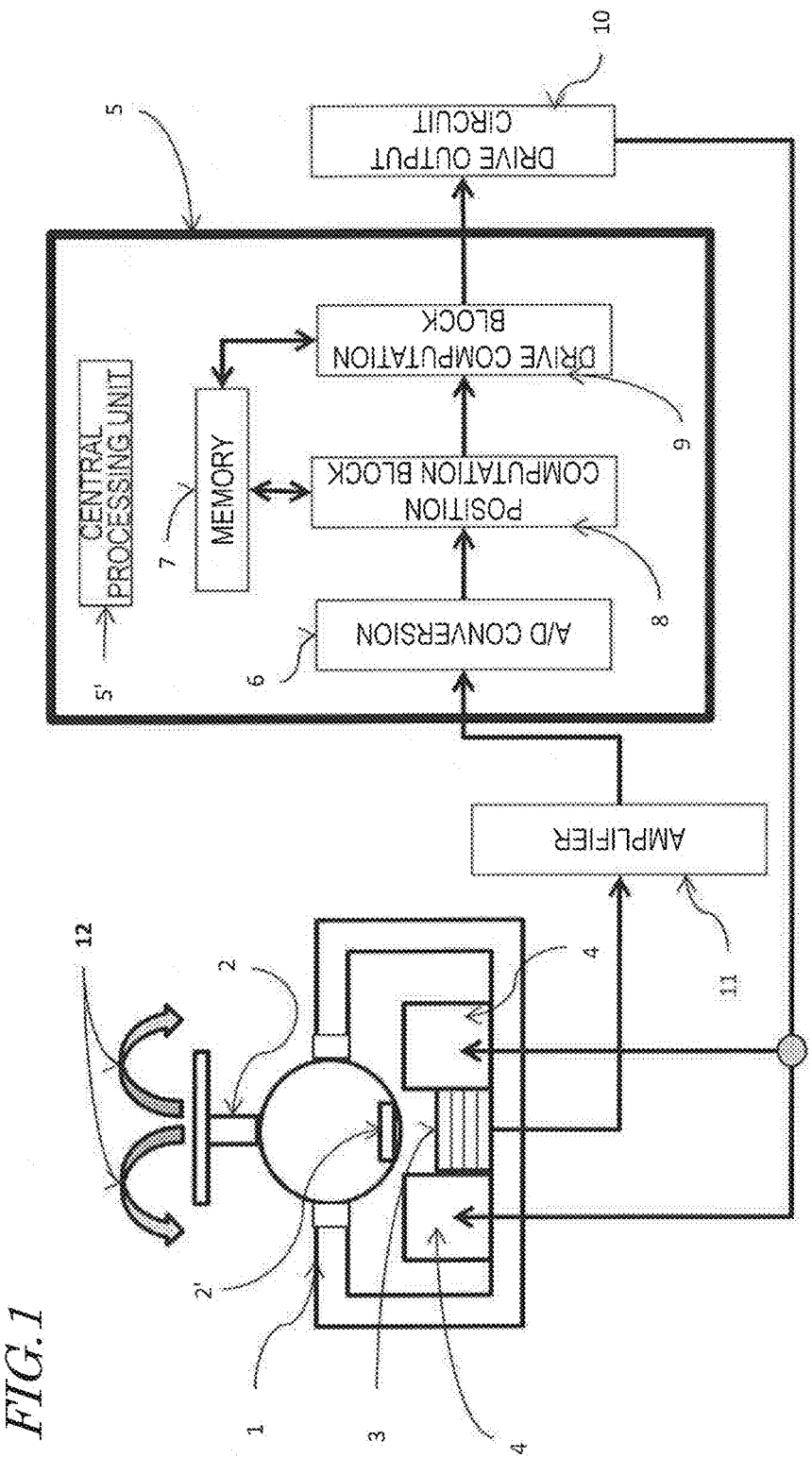
FIG. 1 is a diagram for illustrating a configuration example of an input/output operation device according to a first embodiment of this disclosure.

An input device that is mounted to a vehicle and is configured to receive an operation from an operator is required, for example, to provide quality operation feeling for supporting a comfortable driving environment, which does not depend on a difference in delicacy or a strength of a force, for example, male or female, or a physique, without any stress load felt. An input/output operation device according to this disclosure is capable of providing an setting, by appropriately increasing or reducing a load applied as a tactile sensation to an operation unit to return an appropriate reaction force to any operator.

The input/output operation device according to this disclosure is outlined below.

The input/output operation device according to this disclosure includes: an operation unit, which is operated by an operator; a detection unit, which is configured to detect a position of the operation unit to generate a position signal corresponding to the position of the operation unit; a control circuit, which is configured to receive the position signal to generate a speed control signal; and a drive circuit, which is configured to receive the speed control signal to drive the operation unit, in which the control circuit is configured to: (a) cause the position signal to pass through a first filter circuit to generate a speed signal; (b) cause the position signal to pass through a second filter circuit, which has a frequency transmission characteristic that is different from a frequency transmission characteristic of the first filter circuit, to generate a correction signal; and (c) add at least the speed signal and the correction signal together to generate the speed control signal.

The first filter circuit and the second filter circuit may each have a lower cutoff frequency, and the lower cutoff frequency of the first filter circuit may be higher than the lower cutoff frequency of the second filter circuit.

The first filter circuit and the second filter circuit may be each configured to sample the position signal with a predetermined sampling period, and the predetermined sampling period of the first filter circuit may be shorter than the predetermined sampling period of the second filter circuit.

The first filter circuit may be configured to subject the position signal to differential operation, the second filter circuit may be configured to cause the position signal to pass through a low-pass filter to generate a filtered position signal, and the control circuit may be configured to subtract a correction position signal, which is generated depending on the filtered position signal, from the position signal that has been subjected to the differentiation operation.

The second filter circuit may be configured to subtract an offset signal, which has a constant value within a predetermined time period, from the position signal or the filtered position signal.

The control circuit may be configured to subtract an offset signal, which has a constant value within a predetermined time period, from a signal obtained by causing the position signal to pass through the second filter circuit.

The constant value of the offset signal may be set to a value of the position signal corresponding to a movable operation range of the operation unit.

The lower cutoff frequency of the second filter circuit may be set depending on a speed corresponding to the speed signal, which is generated by causing the position signal to pass through the first filter circuit.

The lower cutoff frequency of the second filter circuit may be set to become smaller as the speed corresponding to the speed signal, which is generated by causing the position signal to pass through the first filter circuit, becomes higher.

The lower cutoff frequency of the second filter circuit may be set depending on the position signal.

The control circuit may be configured to further subject a signal obtained by causing the position signal to pass through the first filter circuit to proportional operation or PI operation to generate the speed signal.

The control circuit may be configured to further subject a signal generated by causing the position signal to pass through the second filter circuit to proportional operation or PI operation to generate the speed signal.

The control circuit may be configured to generate the speed control signal for driving the operation unit in a direction opposite to a direction in which the operation unit is displaced.

The control circuit may be configured to generate the speed control signal for driving the operation unit in the same direction as a direction in which the operation unit is displaced.

The correction position signal may be the filtered position signal.

The correction position signal may be generated by performing discretization operation on the filtered position signal, which is obtained by filtering the position signal.

The proportional operation may include performing proportional operation on a signal obtained by subtracting, from the position signal, a signal obtained by causing the position signal to pass through the second filter circuit, to generate the correction signal, the proportional operation using, as a proportional coefficient, a signal obtained by subjecting, to split operation, the signal obtained by causing the position signal to pass through the second filter circuit.

The correction position signal may be generated by selecting the filtered position signal, which is obtained by filtering the position signal, at predetermined distance intervals to set a target point, and holding the target point for a predetermined time period.

The correction position signal may be obtained by: determining a filtered speed signal, which is obtained by subjecting the filtered position signal, which is obtained by filtering the position signal, to differential operation, and an acceleration signal, which is obtained by subjecting the filtered speed signal to differential operation; adding, when the acceleration signal is a first threshold or more, and when the filtered speed signal is a second threshold or more, a first correction signal to the filtered position signal, which is obtained by filtering the position signal; and subtracting, when the acceleration signal is a third threshold or less, a second correction signal from the filtered position signal.

The control circuit includes an arithmetic unit, a memory, and a program, which is stored in the memory and is configured to be executable by the arithmetic unit, and the arithmetic unit may be configured to execute the program to perform (a) generation of the speed signal, (b) generation of the correction signal, and (c) generation of the speed control speed.

The control circuit may include an analog circuit including an operational amplifier, a resistor, and a capacitor.

First Embodiment

Now, an input/output operation device according to a first embodiment of this disclosure is described. In FIG. 1, a configuration of the input/output operation device according to the first embodiment of this disclosure is schematically illustrated.

The input/output device according to the first embodiment includes an actuator 1, an amplifier 11, a control circuit 5, and a drive output circuit 10.

The actuator 1 includes an operation unit 2 operated by an operator. In the operation unit 2, a T-shaped contact portion, which is directly touched by the operator with his or her hand or fingers, is mounted to a sphere made of a resin. The sphere is provided to be freely rotatable about a center of the sphere. A permanent magnet 2' is provided inside the sphere. The actuator 1 further includes a position detector (detection unit) 3 and an electromagnetic coil 4.

When the operator applies an operating force 12 to the operation unit 2, the position detector 3 acquires a signal indicating a position or a positional change. An example of the position detector 3 includes a Hall element configured to detect a magnetic change of the permanent magnet 2', and the position detector 3 is configured to detect the position of the operation unit 2 with the magnetic change to generate a position signal. The position signal is amplified by the amplifier 11, and is input to the control circuit 5. The amplifier 11 may be included in the control circuit 5.

The control circuit 5 includes a central processing unit (CPU) 5', an A/D converter 6, a memory 7, a position computation block 8, and a drive computation block 9. The A/D converter 6 is configured to convert the amplified analog position signal into a digital signal. The digital position signal is input to the position computation block 8. The position computation block 8 is configured to perform operation on the position signal on the basis of a command value stored in the memory 7, and outputs the position signal (computed position signal) obtained as a result of the operation to the drive computation block 9. The result of the operation is output to the memory 7 as necessary, and the memory 7 stores the position signal obtained as the result of the operation.

The central processing unit 5' executes a computer program, which has been read to the memory 7, to realize functions of the position computation block 8 and the drive computation block 9, which are to be described later. The central processing unit 5' also performs control on other components.

The memory 7 may be volatile or non-volatile. A volatile memory (RAM) is a random access memory that cannot hold stored information without supply of electric power. For example, a dynamic random access memory (DRAM) is a typical volatile RAM. A non-volatile RAM is a RAM capable of holding information even without supply of electric power. Examples of the non-volatile RAM include a magneto-resistive RAM (MRAM), a resistive random access memory (ReRAM), and a ferroelectric random access memory (FeRAM). In the first embodiment, it is preferred to adopt a non-volatile RAM.

Each of the volatile RAM and the non-volatile RAM is an example of a non-transitory computer-readable recording medium. Moreover, a magnetic recording medium, for example, a hard disk, and an optical recording medium, for example, an optical disc, are also examples of the non-transitory computer-readable recording medium. In other words, a computer program according to this disclosure may be recorded on a variety of non-transitory computer-readable media other than media (transitory media), such as air, that allow the computer program to propagate as a radio signal.

The drive computation block 9 is configured to generate a speed control signal on the basis of the position signal obtained as the result of the operation, and outputs the speed control signal to the drive output circuit 10, which is configured to drive the electromagnetic coil 4. The speed control signal from the drive computation block 9 is also output to the memory 7 as necessary to be stored therein.

The drive output circuit 10 is configured to generate a drive signal for driving the electromagnetic coil 4 on the basis of the speed control signal. An electric current is allowed to flow through the electromagnetic coil 4, and a magnetic force of the electromagnetic coil 4 acts on the permanent magnet 2' located in the sphere of the operation unit 2 to rotate the sphere. As a result, the operator feels a load from the operation unit 2. The permanent magnet 2' and the electromagnetic coil 4 correspond to a drive unit.

Of the above-mentioned components, as the operation unit 2, a joy stick, a slide device, and other such devices capable of being operated to be displaced in one axial direction or two axial directions, a steering wheel, a rotary dial, and other such devices capable of being operated to rotate about a shaft, or a trackball and other such devices capable of being rotated about a center point may be used. As the position detector 3, a Hall element, a magnetoresistive element, and other such magnetic sensors, or a photocoupler and other such optical sensors may be used.

The input/output operation device according to the first embodiment generates a speed signal of the operation unit 2 on the basis of the position signal of the operation unit 2, and drives the operation unit 2 on the basis of the speed signal in a direction opposite to a direction in which the operation unit 2 is displaced by the operator. As a result, the operator feels, as a load felt from the operation unit 2, a large resistance when moving the operation unit 2 fast or with a large operating force, and a small resistance when moving the operation unit 2 slowly or with a small operating force. Moreover, the input/output operation device is controlled at a high frequency with respect to the displacement of the operation unit 2 by the operator, and hence as the operation unit 2 is operated faster, the above-mentioned driving of the operation unit 2 is performed with faster response. Therefore, the input/output operation device according to the first embodiment provides viscosity perception to the operator. A configuration therefor is described below in detail.

Figure 2A:
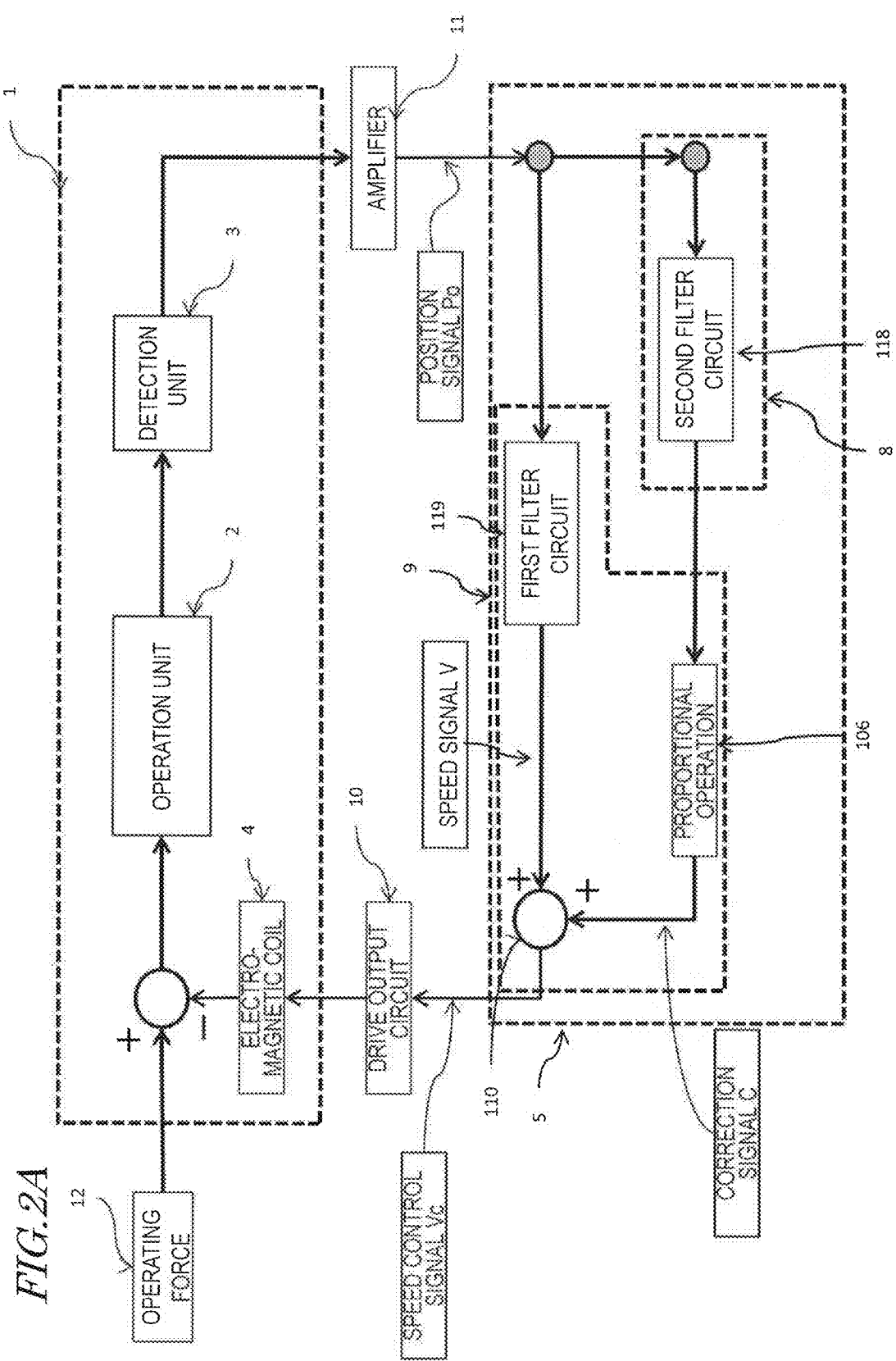
FIG. 2A is a diagram for illustrating a schematic configuration example of the input/output operation device according to the first embodiment.

FIG. 2A is a block diagram for illustrating an example of a schematic configuration of the input/output operation device illustrated in FIG. 1. As described above, when the operator applies the operating force 12 as the load to the operation unit 2, the position detector 3 generates a position signal indicating a position or a positional change of the operation unit 2. The position signal is amplified by the amplifier 11, and is subjected to A/D conversion in the control circuit 5 to form a position signal Po.

The drive computation block 9 and the position computation block 8 of the control circuit 5 include a first filter circuit 119 and a second filter circuit 118, respectively. Each of the first filter circuit 119 and the second filter circuit 118 has a function of a high-pass filter. When the position signal Po passes through the first filter circuit 119 and the second filter circuit 118 so that the position signal Po is filtered, the position signal Po is substantially differentiated to generate the speed signal. As a result, control for driving the operation unit 2 depending on the above-mentioned speed at which the operation unit 2 is displaced by the operator may be performed.

Moreover, the high-pass filters of the first filter circuit 119 and the second filter circuit 118 have different frequency transmission characteristics. As a result, different control characteristics may be imparted to two speed signals generated by causing the position signal Po to pass through the first filter circuit 119 and the second filter circuit 118, and more complicated control on the operation unit 2 may be achieved with a speed control signal Vc, which is obtained by adding the two speed signals together by an adder 110.

Figure 2B:
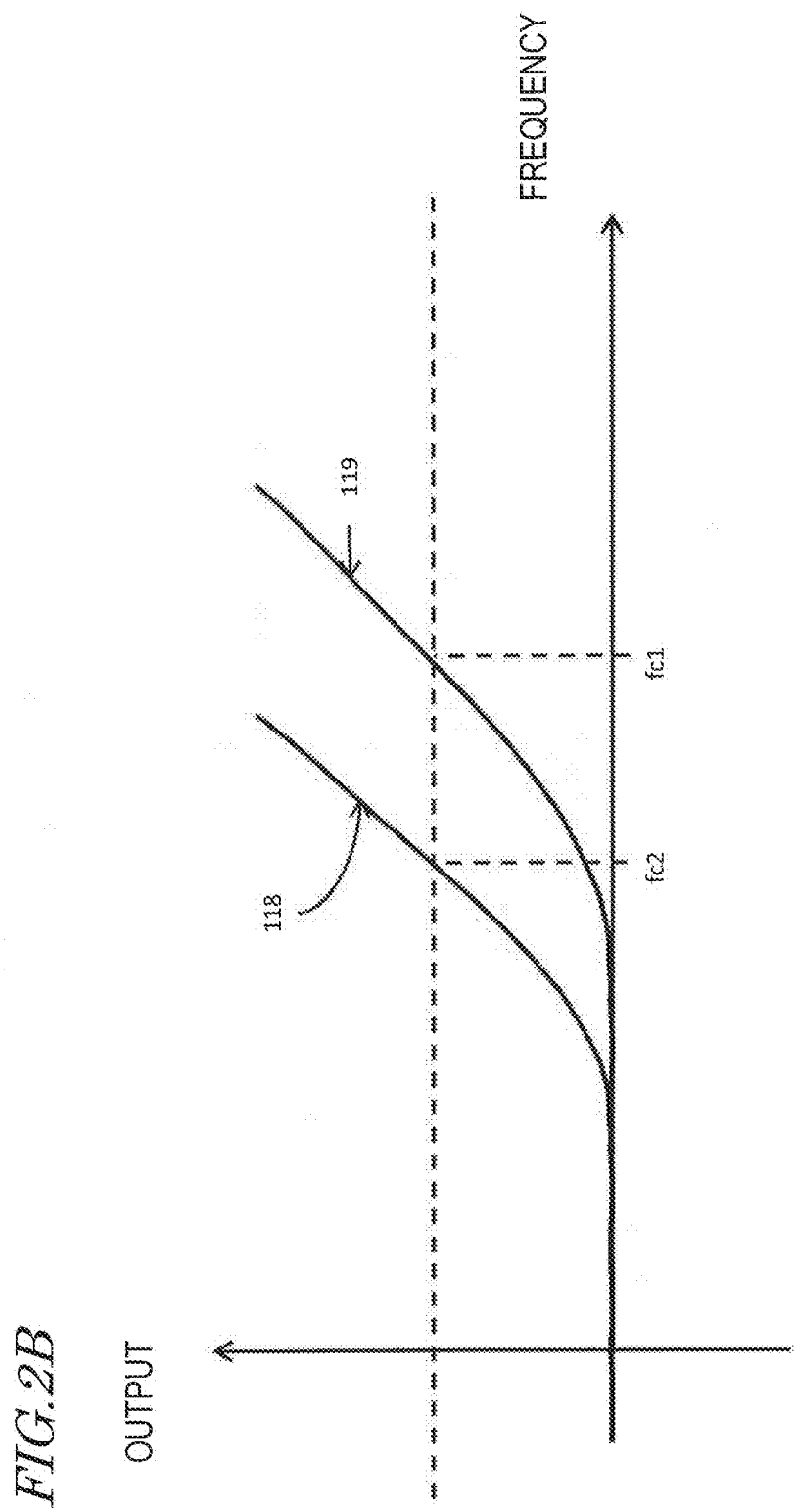
FIG. 2B is a schematic graph for showing frequency characteristics of first and second filter circuits of the input/output device illustrated in FIG. 2A.

For example, as shown in FIG. 2B, a lower cutoff frequency fc1 of the first filter circuit 119 is higher than a lower cutoff frequency fc2 of the second filter circuit 118. The positional change of the operation unit 2 by the operator is an operation by a human, and hence generates a position signal having a relatively low frequency component (for example, several tens of Hz or less). Therefore, when the operation unit 2 is driven in response to an operation by the operator, the low frequency component of the position signal may be used to present perception of control with excellent responsiveness. In other words, when the operation unit 2 that presents the viscosity perception is driven, it is preferred to mainly use the position signal obtained by causing the position signal to pass through the second filter circuit 118.

Meanwhile, the fingers and the palm of the operator are capable of sensing vibrations of the operation unit 2 caused by a frequency component (for example, several hundred Hz or less) that is higher than those of positional changes. Therefore, the lower cutoff frequency fc1 of the first filter circuit 119 may be used to present such tactile sensation.

The functions of the high-pass filters of the first filter circuit 119 and the second filter circuit 118 may be realized with various circuit configurations. Now, specific examples of the drive computation block 9 and the position computation block 8 including the first filter circuit 119 and the second filter circuit 118, respectively, are described.

Figure 2C:
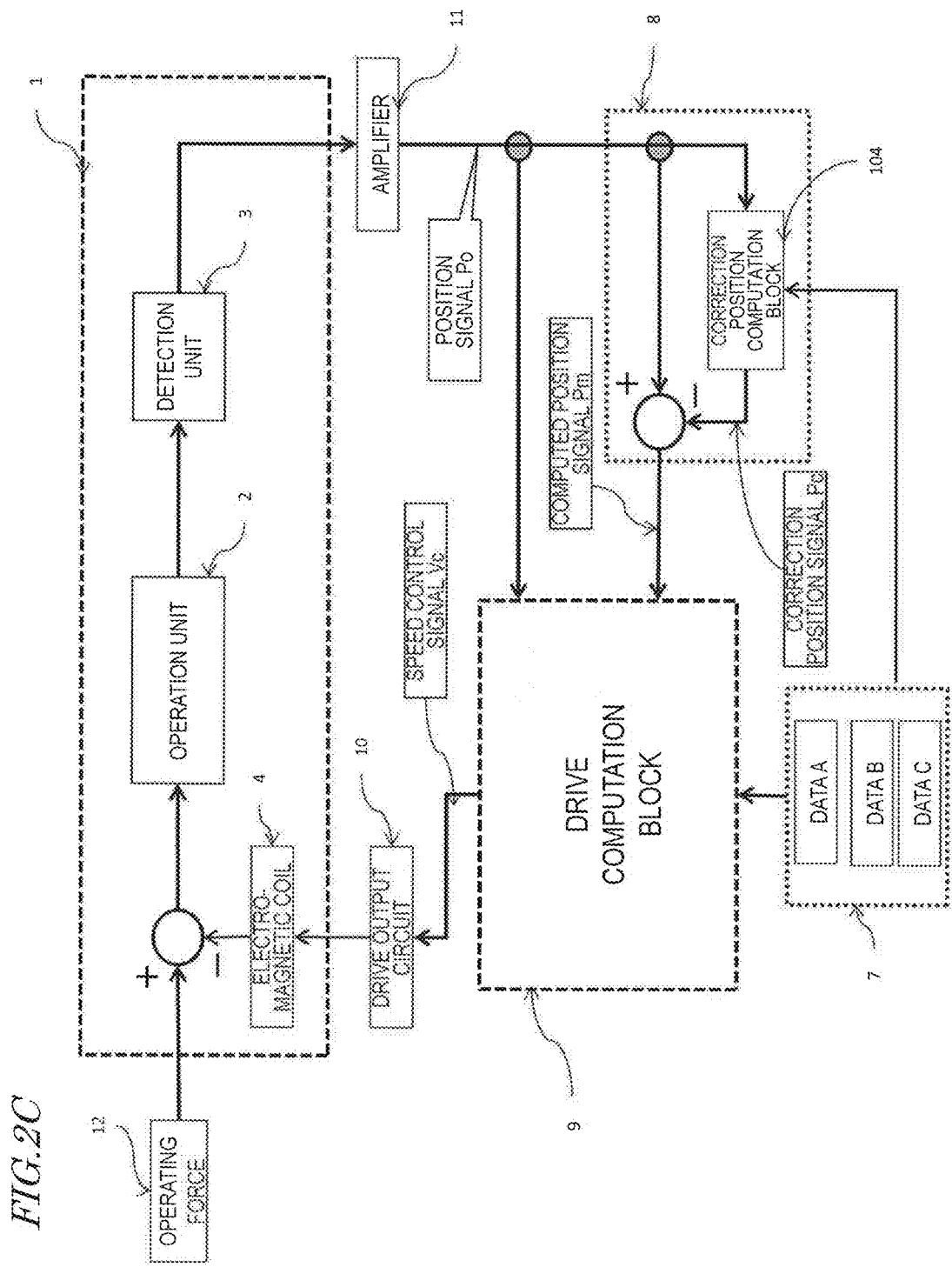
FIG. 2C is a diagram for illustrating a detailed configuration example of the input/output operation device according to the first embodiment.

FIG. 2C is a block diagram for illustrating an example of a configuration of the position computation block 8 illustrated in FIG. 2A. As described above, the position signal Po that has been subjected to the A/D conversion in the control circuit 5 is output to the position computation block 8 and the drive computation block 9. The position computation block 8 includes a correction position computation block 104, and the correction position computation block 104 is configured to generate a correction position signal Pc on the basis of the position signal Po. The position computation block 8 determines a difference between the position signal Po and the correction position signal Pc, and outputs the difference as a computed position signal Pm to the drive computation block 9. The drive computation block 9 is configured to compute the position signal Po and the computed position signal Pm to output the speed control signal Vc. The speed control signal Vc is output to the drive output circuit 10, and output from the drive output circuit 10 is allowed to flow through the electromagnetic coil 4 to apply a load to the operator.

Figure 2D:
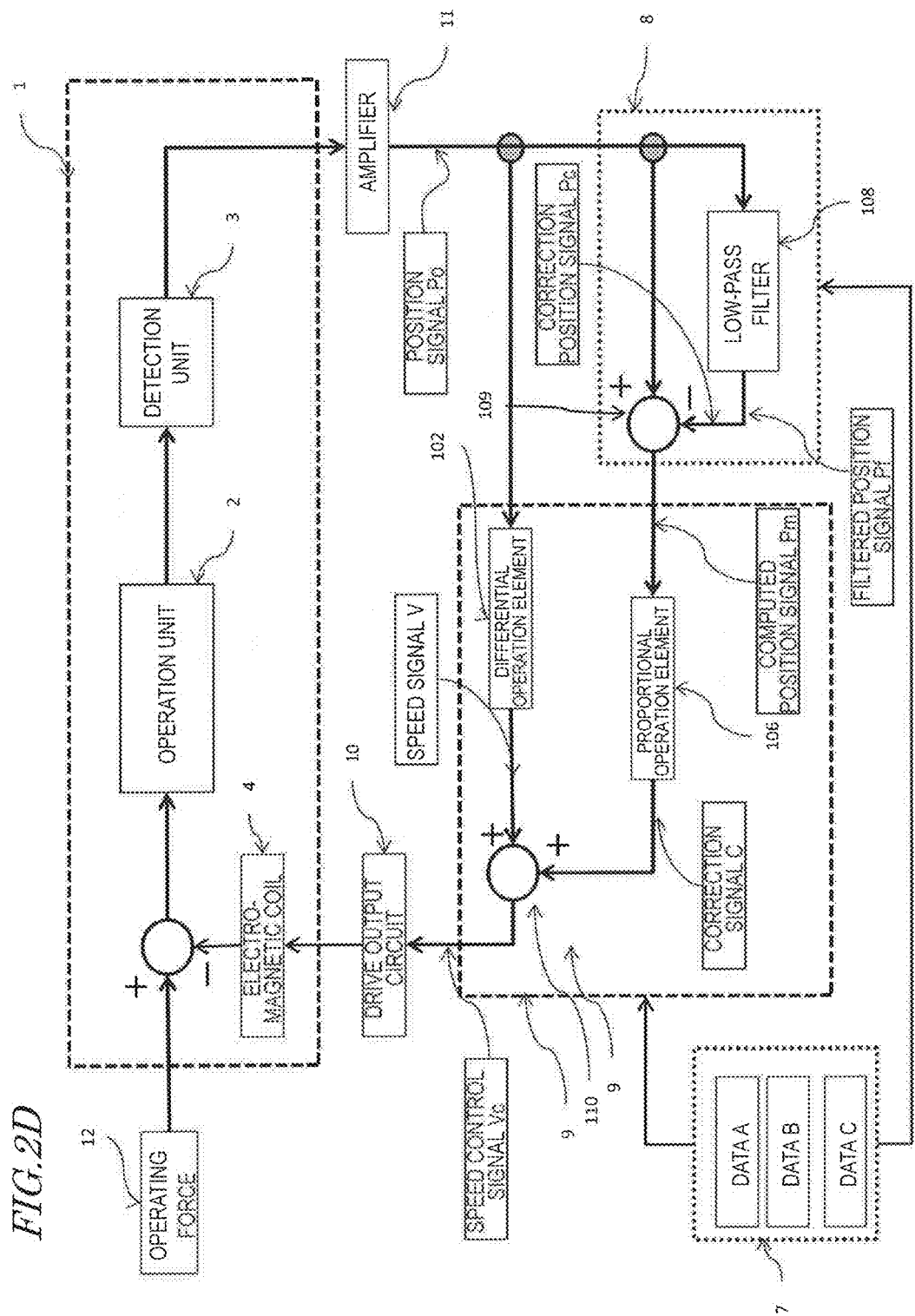
FIG. 2D is a diagram for illustrating a specific configuration example of the input/output operation device according to the first embodiment.

In FIG. 2D, an example of a more specific configuration for obtaining the viscosity perception is illustrated. In the configuration illustrated in FIG. 2D, the position computation block 8 includes a low-pass filter 108 as the correction position computation block 104 (FIG. 2C). The position signal Po passes through the low-pass filter 108, and is filtered thereby to generate a filtered position signal Pf. In the first embodiment, the filtered position signal Pf is used as a continuous correction position signal Pc. The position computation block 8 sequentially determines a difference between the position signal Po and the correction position signal Pc, and outputs the difference as the computed position signal Pm.

Figure 2E:
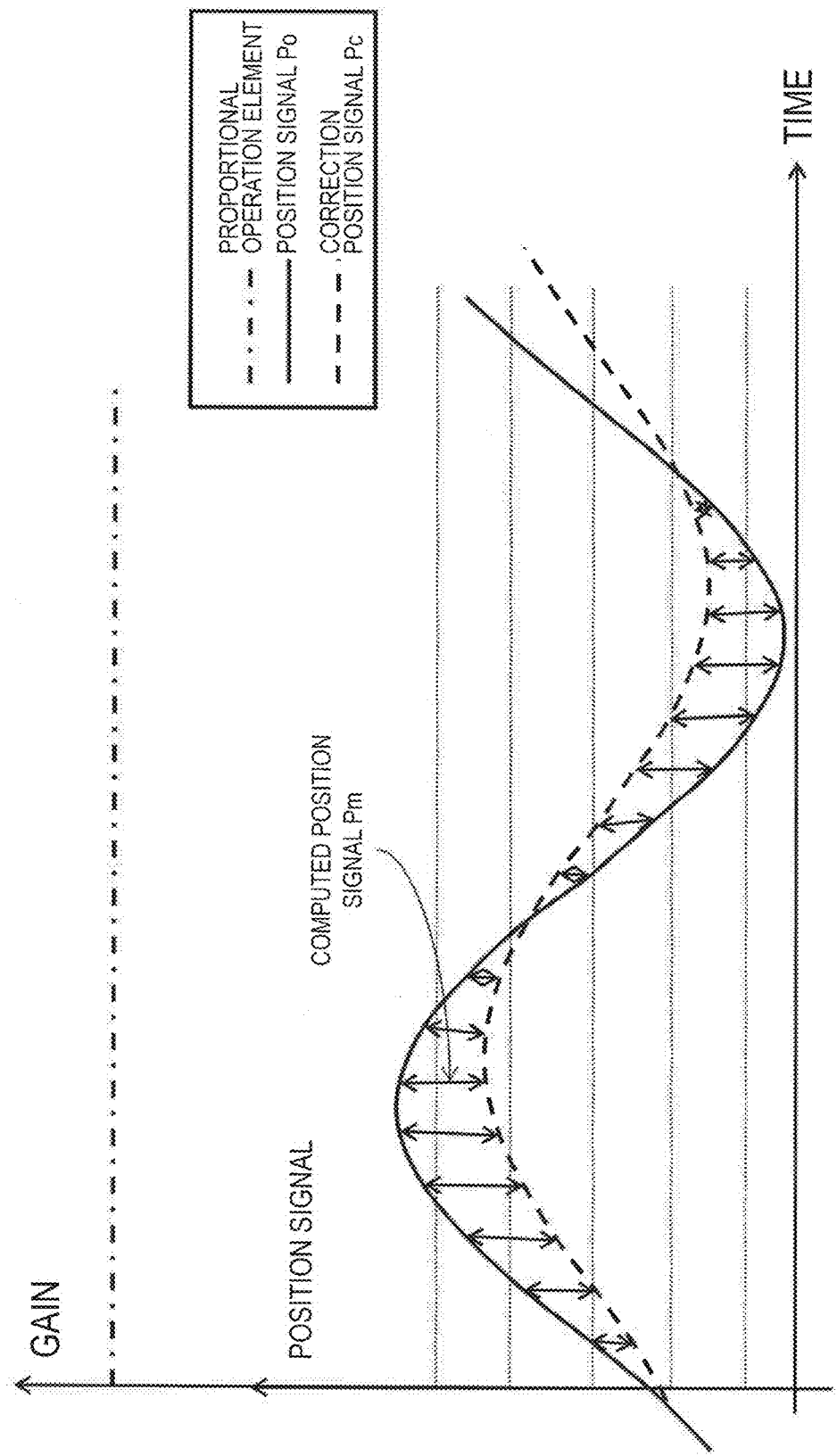
FIG. 2E is a graph for schematically showing an example of a position signal Po, a correction position signal Pc, and a computed position signal Pm in the input/output operation device illustrated in FIG. 2D.

In FIG. 2E, an example of the position signal Po, the correction position signal Pc, and the computed position signal Pm is schematically shown. The low-pass filter 108 cuts off a signal having a predetermined frequency or more by not allowing the signal to pass therethrough. Therefore, the correction position signal Pc has a lower frequency, a delayed phase, and a smaller amplitude as compared to the position signal Po. As the frequency of the position signal Po becomes higher, a shape of the correction position signal Po becomes more different from a shape of the position signal Po, and the computed position signal Pm, which is the difference between the correction position signal Pc and the position signal Po, becomes larger. In other words, the computed position signal Pm is affected by the correction position signal Pc, which is a low-frequency component of the position signal Po.

The drive computation block 9 includes a differential operation element 102 and a proportional operation element 106. The differential operation element 102 receives the position signal Po, and differentiates the position signal Po with respect to time to calculate an amount of change of the position signal per unit time, for example, to thereby generate a speed signal V.

The proportional operation element 106 is configured to perform proportional operation on the computed position signal Pm. Specifically, the proportional operation element 106 multiplies the computed position signal Pm, which is obtained from the position computation block 8, by a constant of proportionality to output a correction signal C. The drive computation block 9 adds the correction signal C to the speed signal V to generate the speed control signal Vc.

The speed signal V generated in the drive computation block 9 corresponds to a signal indicating a displacement speed (first speed) of the operation unit 2. Meanwhile, the correction signal C is obtained by sequentially determining the computed position signal Pm, which is the difference between the correction position signal Pc and the position signal Po, and multiplying the computed position signal Pm by the constant of proportionality. Therefore, the correction signal C is a value based on an amount of positional change, and may be said to be the speed signal. Therefore, the speed control signal Vc, which is a sum of the speed signal V and the correction signal C, is a speed signal (second speed) that is different from the displacement speed of the operation unit 2.

In other words, the speed control signal Vc is generated on the basis of the position signal Po, and is a signal for driving the operation unit 2 depending on the displacement speed (first speed) of the operation unit 2, at a speed (second speed) that is different from the displacement speed. When the drive unit is to drive the operation unit 2 at the second speed with the speed control signal Vc, in reality, the operator is moving the operation unit 2 at the first speed in a direction opposite to a direction in which the drive unit is driven. Therefore, the drive unit applies a load to the operator through the operation unit 2 with the speed control signal Vc. Therefore, the operator moves the operation unit 2 while feeling the load, and feels a weight (dullness) in the movement of the operation unit 2, which is caused by the load.

Constants and parameters used in the operation by the position computation block 8 and the drive computation block 9 are stored as data A, B, and C in the memory 7, for example, and are read at the time of the operation. A plurality of sets of the constants and the parameters are prepared, and one set may be selected from among the plurality of sets of data on the basis of a change in tactile setting through an operation by the operator, an instruction from a vehicle or other such equipment equipped with the input/output operation device, and other such factors.

In the input/output operation device according to the first embodiment, the drive computation block 9 adds the correction signal C to the speed signal V to generate the speed control signal Vc. The correction signal C is generated using a low-pass filter of several tens of Hz or less as the low-pass filter 108, which is the position computation block 8. When a reaction force generated with the speed control signal Vc is expressed in frequency characteristics, the reaction force is increased with the correction signal C from a low frequency band to a high frequency band, and is further increased by the speed signal V added thereto in the high frequency band. Therefore, a reaction force to the operating force of the operator may be increased in a wide frequency band. With the input/output operation device in the first embodiment, at a natural speed at which the operator operates the operation unit 2 with his or her fingers or entire palm, sufficient viscosity perception can be obtained.

By thus adding the correction signal C, which uses the filtered position signal Pf that has passed through the low-pass filter, to the speed signal V to generate the speed control signal Vc, as compared to the case of using, as the speed control signal, a signal obtained by simply subjecting the speed signal V to the proportional operation, the sufficient viscosity perception can be obtained. The drive output circuit 10 is configured to generate a drive signal on the basis of the speed control signal Vc, and outputs the drive signal to the electromagnetic coil 4. The magnetic force of the electromagnetic coil 4 acts on the permanent magnet 2' with the drive signal, and the operation unit 2 operates in a direction opposite to the operating force 12, that is, acts as the load. Therefore, the operator perceives such operation feeling as being pushed back by the operation unit 2.

As described above, according to the first embodiment, it is possible to realize the input/output operation device configured to present perception of viscosity, which has been difficult to present in the related art, depending on the speed at which the operation unit is operated. For example, when a slow operation with a small operating force is performed, a light operation sensation with a small load can be presented. On the other hand, when a fast operation with a strong operating force is performed, the load can be increased to present a heavy operation sensation. As a result, a movement of the operation unit can be slowed down to suppress an erroneous operation caused by moving the operation unit too much.

In the first embodiment, the magnetic force generated by the permanent magnet 2' and the electromagnetic coil 4 acts in the direction opposite to the operating force 12. However, the drive computation block 9 may output, to the drive output circuit 10, a speed control signal obtained by inverting the sign of the generated speed control signal Vc. Alternatively, the drive computation block 9 may input the drive signal to the drive output circuit 10 so that the magnetic force acts in the same direction as the operating force 12. In this case, a tactile sensation corresponding to a movement intended by the operator can be presented. For example, a quick operation of the operation unit suggests a movement to a far position, and hence the load can be reduced to move the operation unit to a target position earlier. Moreover, a slow operation suggests that the operation unit is approaching the target, and hence the load can be increased to reduce a deviation from the target position.

The configuration of the position computation block 8 and the drive computation block 9 in the first embodiment is not limited to that illustrated in FIG. 2D, and various alterations may be made thereto.

Figure 2F:
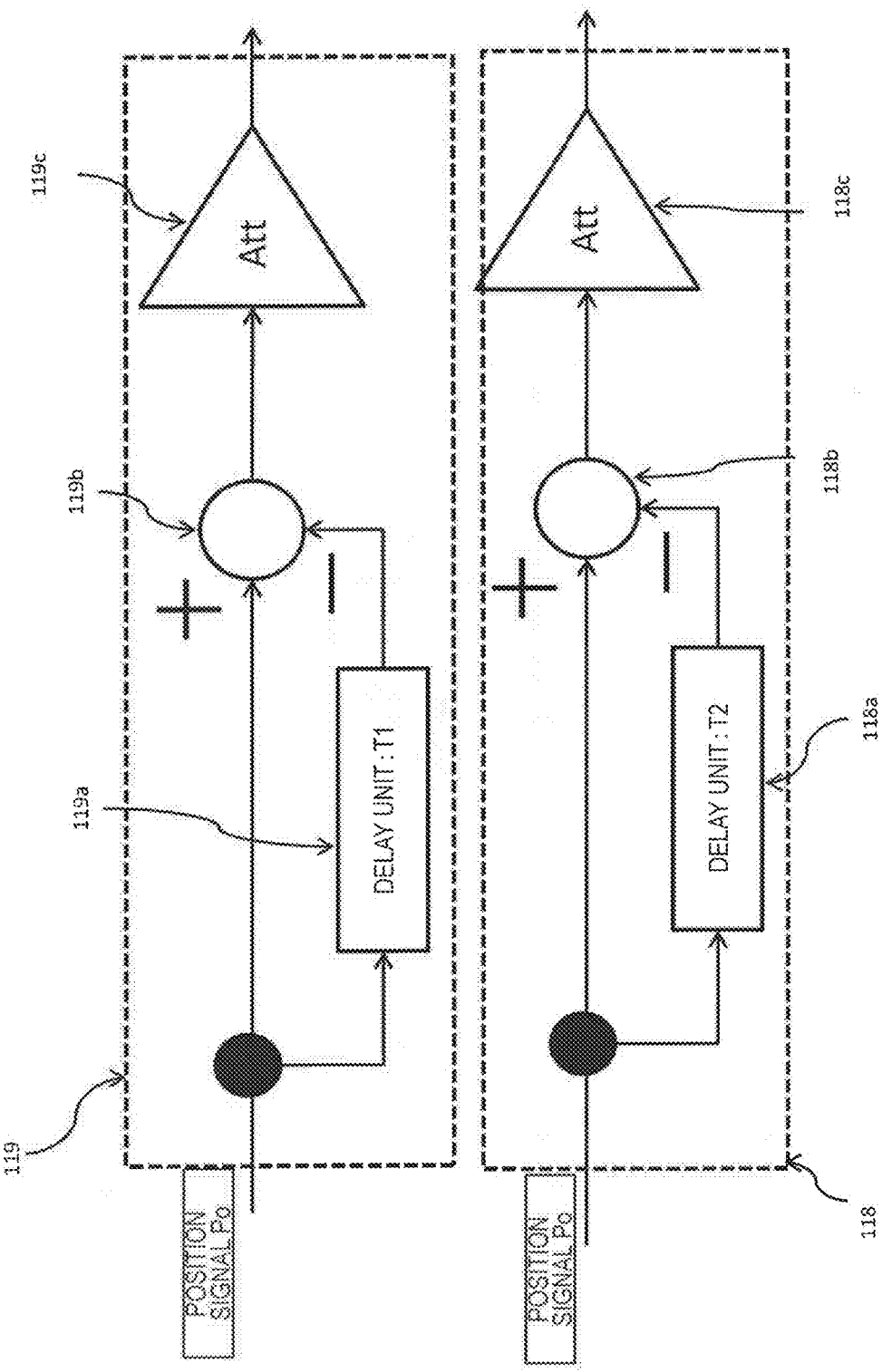
FIG. 2F is a diagram for illustrating another configuration example of the first and second filter circuits of the input/output operation device according to the first embodiment.

For example, the functions of the high-pass filters of the first and second filter circuits 119 and 118 described with reference to FIG. 2A may be realized using a delay unit. Specifically, as illustrated in FIG. 2F, the first filter circuit 119 includes a delay unit 119a, a subtractor 119b, and an attenuator 119c. The delay unit 119a samples the position signal Po with a predetermined sampling period T1. The subtractor 119b is configured to subtract output of the delay unit 119a from the position signal Po. The attenuator 119c is configured to attenuate an output signal from the subtractor 119b. Similarly, the second filter circuit 118 includes a delay unit 118a, a subtractor 118b, and an attenuator 118c. The delay unit 118a samples the position signal Po with a predetermined sampling period T2. The subtractor 118b is configured to subtract output of the delay unit 118a from the position signal Po. The attenuator 118c is configured to attenuate an output signal from the subtractor 118b. The sampling period T1 is sufficiently shorter than the sampling period T2 (T1<<T2). Therefore, the first filter circuit 119 illustrated in FIG. 2F realizes the function as the high-pass filter. Moreover, it can be said that the sampling period T2 is sufficiently longer than the sampling period T1, and hence the second filter circuit 118 realizes the function as the low-pass filter.

Figure 2H:
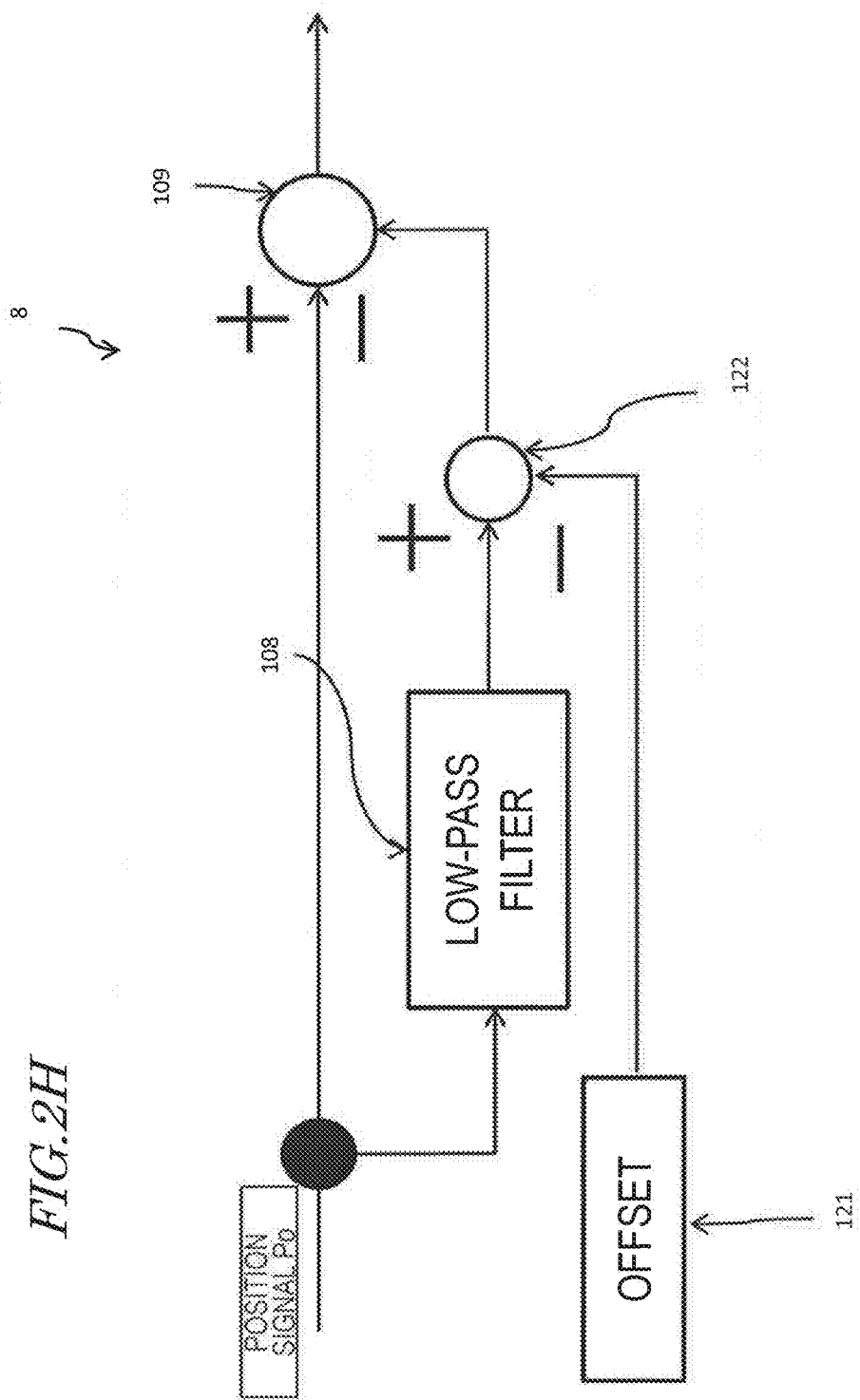
FIG. 2H is a diagram for illustrating yet another configuration example of the second filter circuit of the input/output operation device according to the first embodiment.
Figure 21:
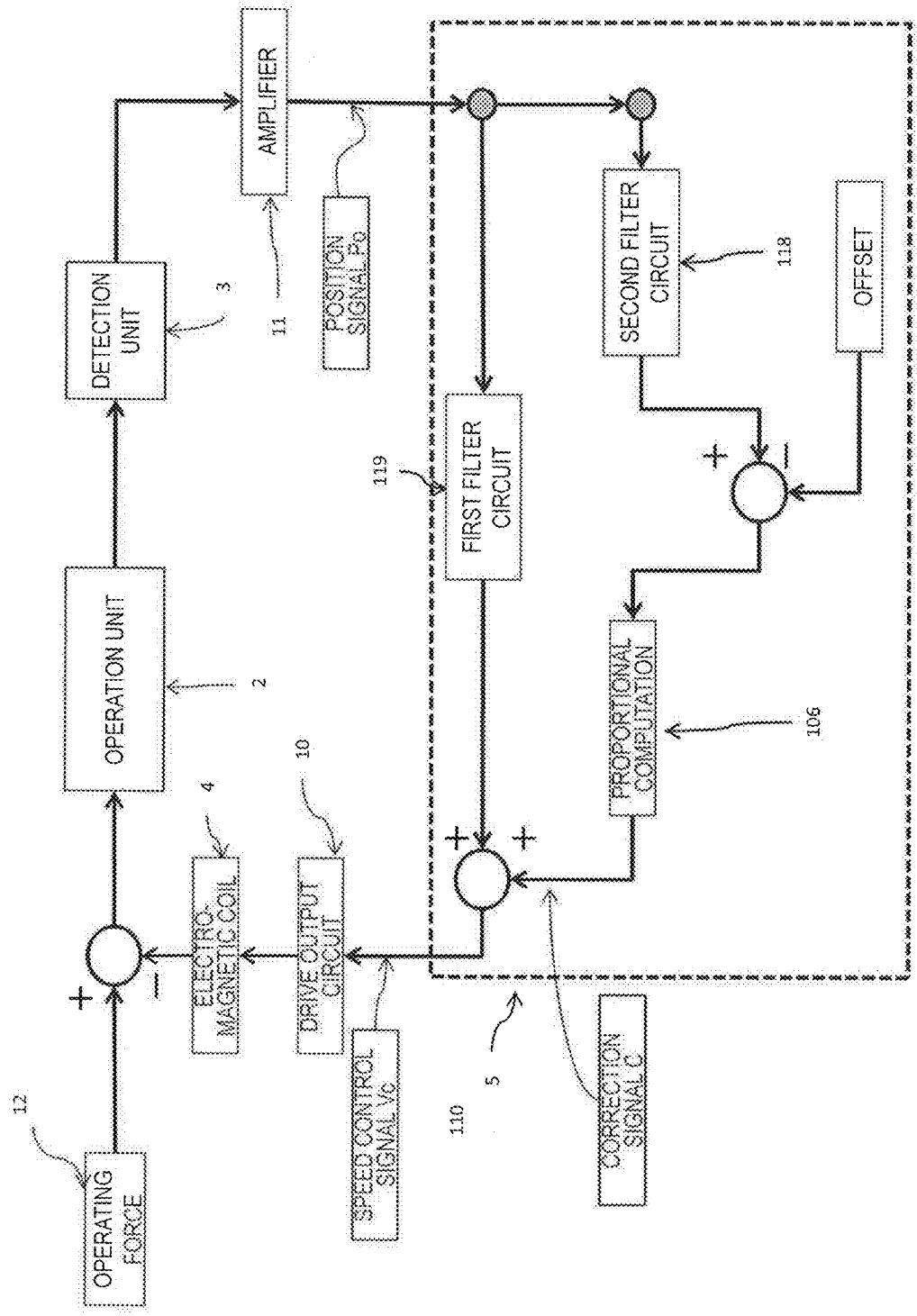

Moreover, the position computation block 8 of the second filter circuit 118 illustrated in FIG. 2C may include, as illustrated in FIG. 2G and FIG. 2H, in addition to the low-pass filter 108 and a subtractor 109, an offset signal generator 121, which is configured to output a constant value for a predetermined time period, and a subtractor 122. As illustrated in FIG. 2G, the position computation block 8 subtracts an offset signal from the position signal Po, and causes the obtained signal to pass through the low-pass filter 108. According to this configuration, when the operation unit 2 is positioned within a predetermined region P, control for guiding the operation unit 2 to a particular position C within the predetermined region P may be achieved, for example.

Moreover, as illustrated in FIG. 2H, the subtractor 122 may subtract an offset signal from the position signal that has passed through the low-pass filter 108. According to this configuration, during displacement of the operation unit 2, the offset signal generator 121 may output offset signals corresponding to positions indicated by positions C1, C2, . . . at constant time intervals to apply a sensation that click feeling is generated at the positions C1, C2, . . . to the operator, for example. This function may also be realized by adopting a configuration in which, as illustrated in FIG. 2I, an offset signal is applied to the computed position signal Pm of the position computation block 8, for example.

Figure 2J:
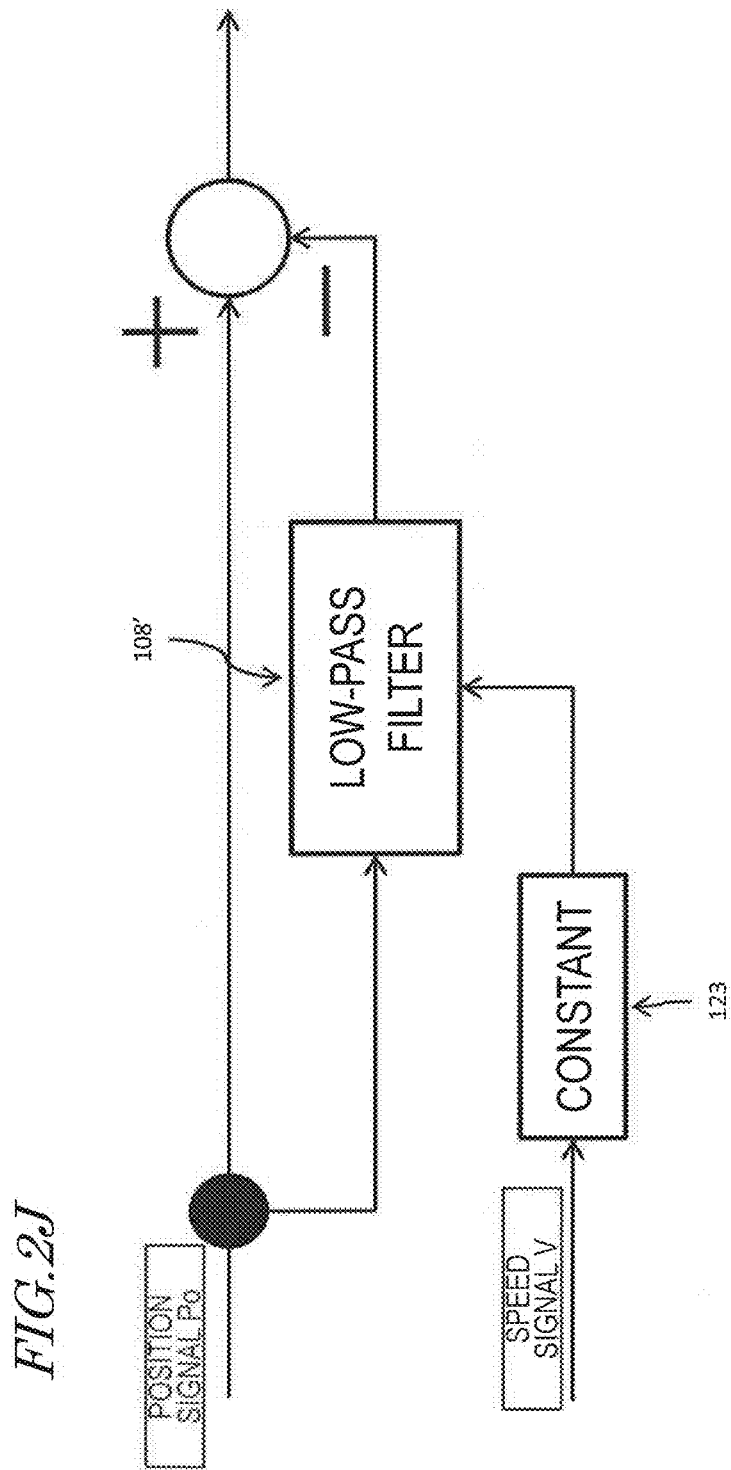
FIG. 2J is a diagram for illustrating yet another configuration example of the second filter circuit of the input/output operation device according to the first embodiment.
Figure 2K:
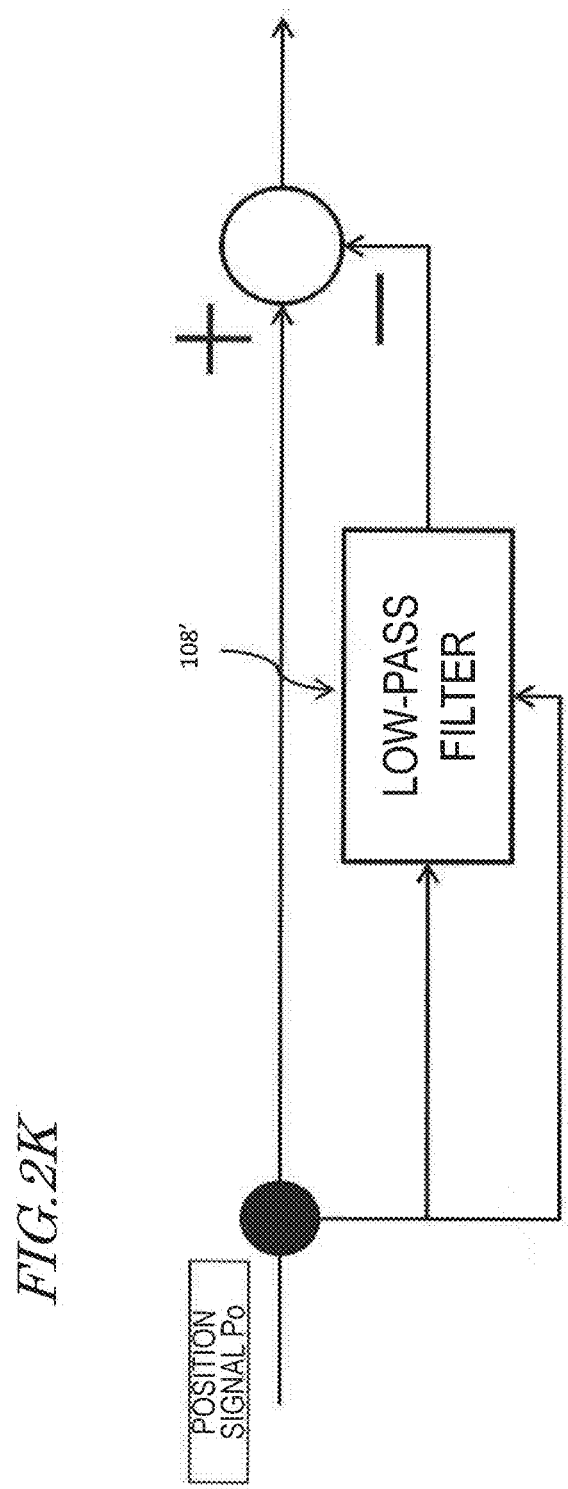
FIG. 2K is a diagram for illustrating yet another configuration example of the second filter circuit of the input/output operation device according to the first embodiment.

Moreover, as illustrated in FIG. 2J and FIG. 2K, characteristics of the low-pass filter 108 of the second filter circuit 118 may be changed. For example, in the configuration of the input/output device illustrated in FIG. 2D, a cutoff frequency of a low-pass filter 108' may be set by a constant unit 123 as illustrated in FIG. 2J. The constant unit 123 receives the speed signal V from the differential operation element 102, which is the first filter circuit 119, and sets the cutoff frequency of the low-pass filter 108 depending on the speed signal V, for example. To this end, the constant unit 123 may include a table in which a value of the cutoff frequency corresponding to a range of values of the speed signal V is determined. For example, the constant unit 123 may include a table in which a lower cutoff frequency is associated as the speed signal V becomes larger.

Figure 2L:
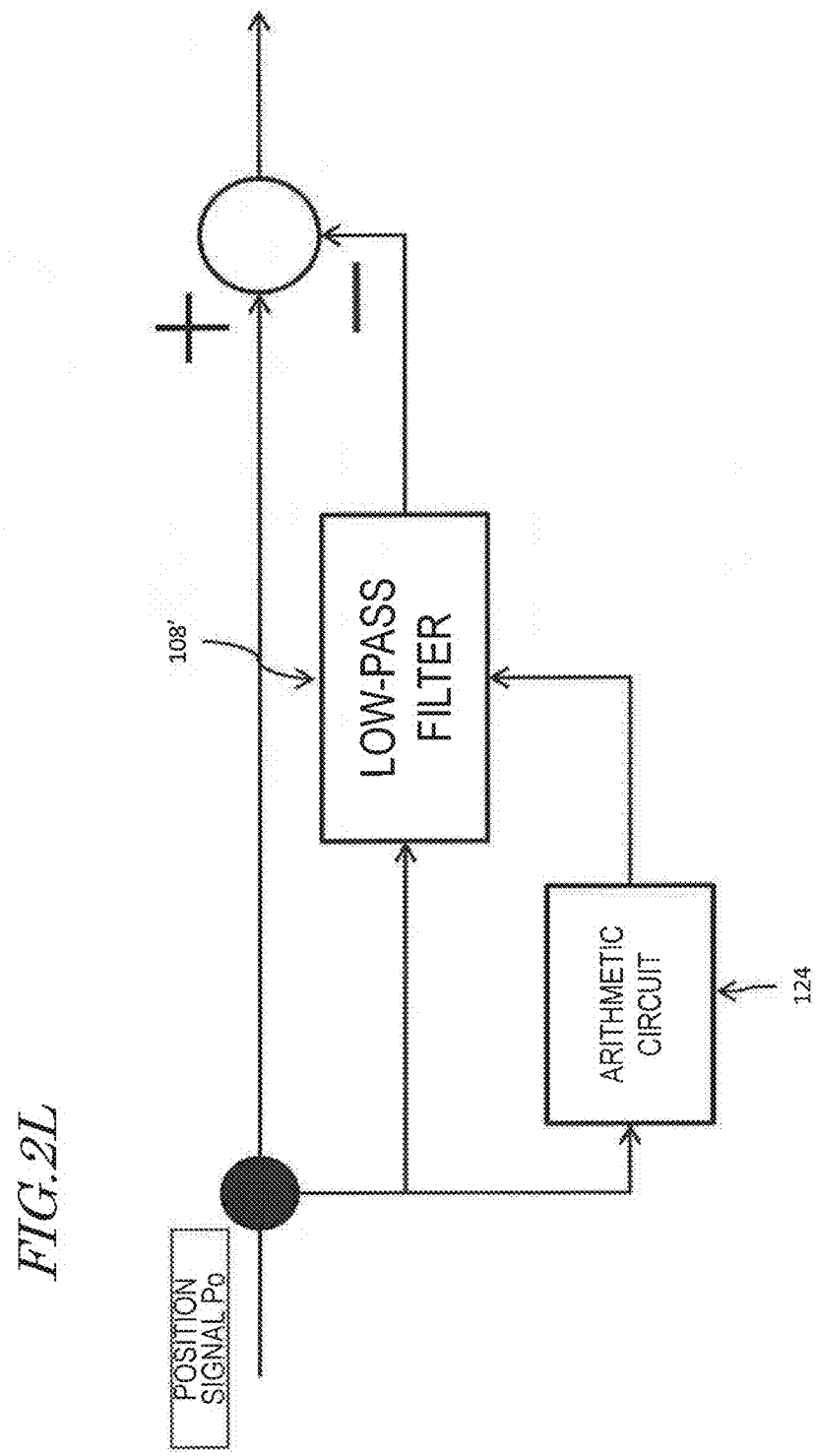
FIG. 2L is a diagram for illustrating yet another configuration example of the second filter circuit of the input/output operation device according to the first embodiment.

Moreover, as illustrated in FIG. 2K, the cutoff frequency of the low-pass filter 108' may be set depending on the position signal Po. Alternatively, as illustrated in FIG. 2L, the second filter circuit 118 may include an arithmetic circuit 124, which receives the position signal Po, and determines the cutoff frequency of the low-pass filter 108' depending on the position signal. In this case, the arithmetic circuit 124 may calculate the cutoff frequency through an operation using the position signal Po, or may include a table in which the position signal Po and the cutoff frequency are associated with each other, and refer to the table to determine the cutoff frequency.

Figure 2M:
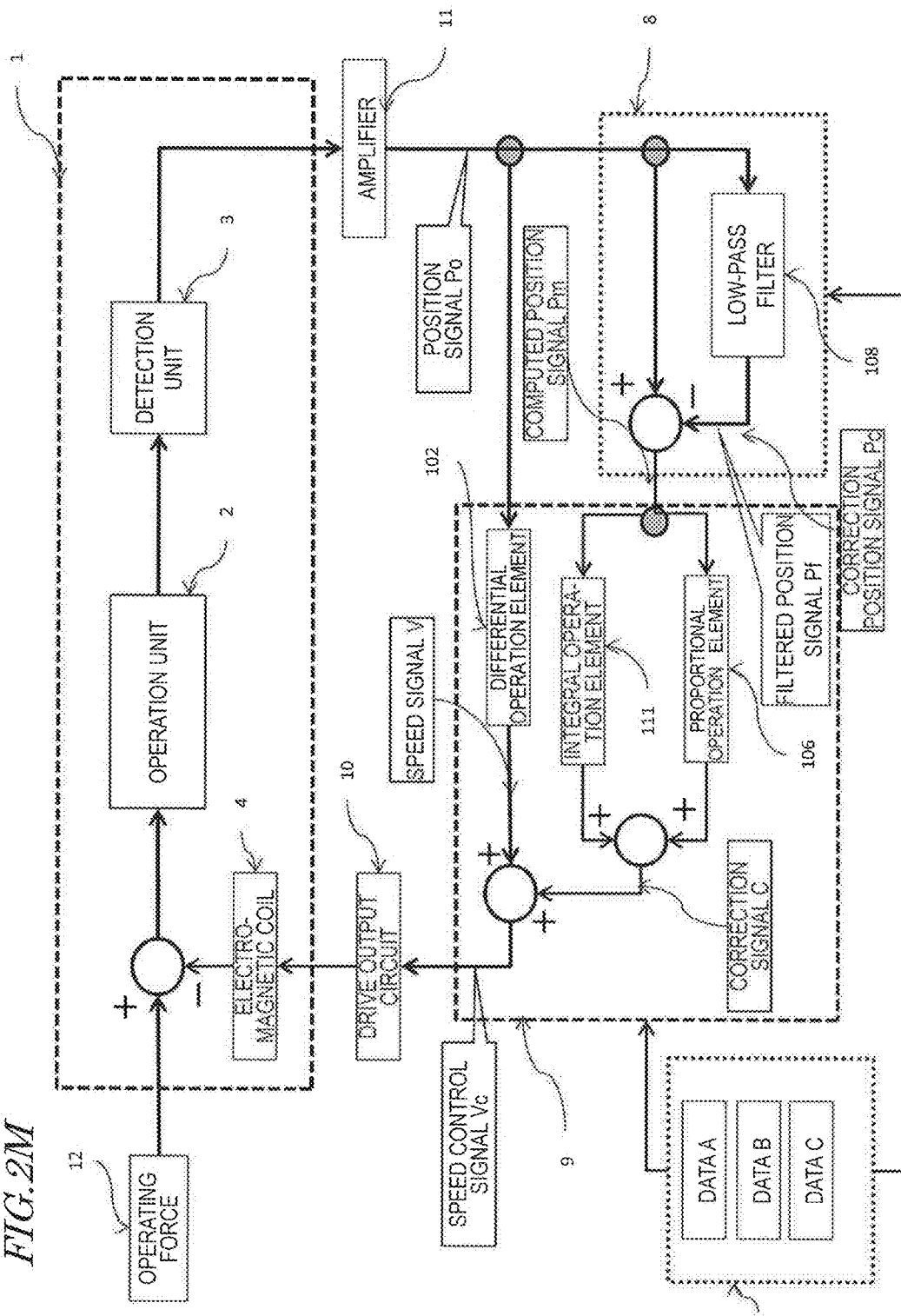
FIG. 2M is a diagram for illustrating another specific configuration example of the input/output operation device according to the first embodiment.

Moreover, as illustrated in FIG. 2M, the drive computation block 9 may perform PI (proportional+integral) operation on the computed position signal Pm. Specifically, the drive computation block 9 may include the proportional operation element 106 and an integral operation element 111, which are connected in parallel to each other. The integral operation element 111 is configured to perform integral operation on the computed position signal Pm to output a value of an integral. The drive computation block 9 adds a value that is obtained from the proportional operation element 106 by multiplying the computed position signal Pm by the constant of proportionality, and a value obtained by integrating the computed position signal Pm together to generate the correction signal C. Also with such circuit, the input/output operation device configured to present the perception of viscosity as described above can be realized.

Figure 2N:
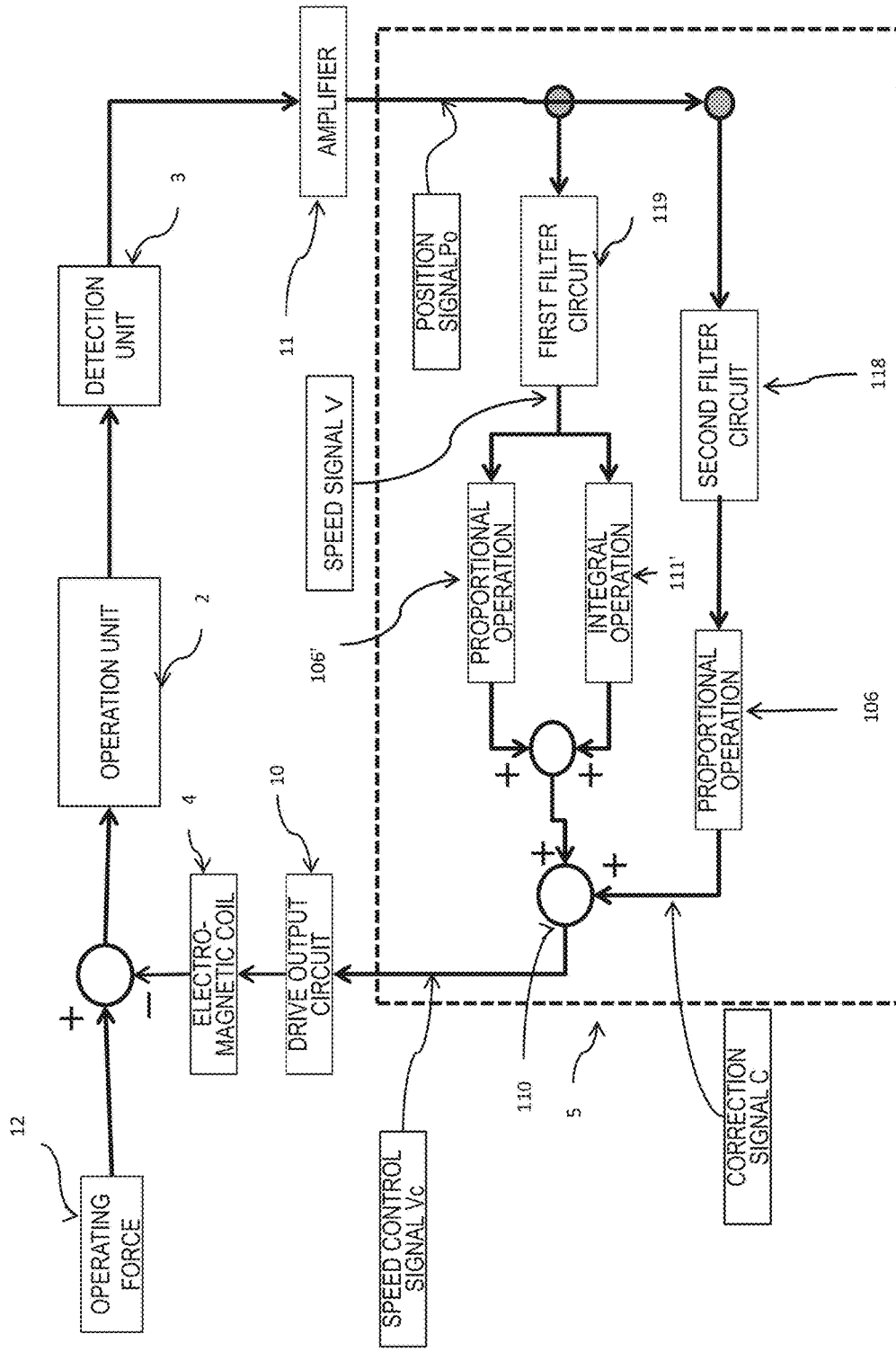
FIG. 2N is a diagram for illustrating still another specific configuration example of the input/output operation device according to the first embodiment.
Figure 20:
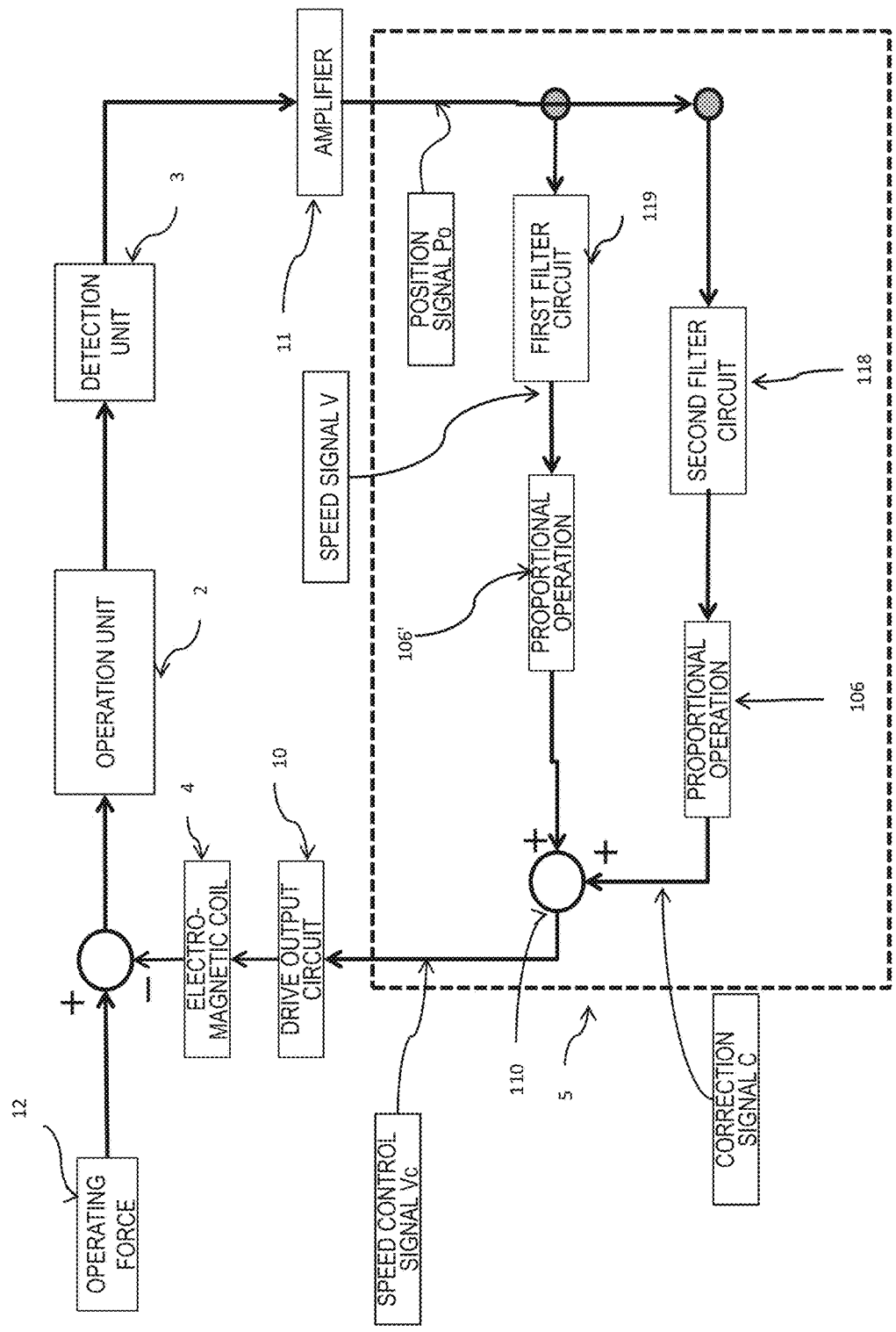

Similarly, PI operation may be performed on the speed signal obtained from the first filter circuit 119. Specifically, as illustrated in FIG. 2N, the drive computation block 9 may include a proportional operation element 106' and an integral operation element 111', which are connected in parallel to each other. The integral operation element 111' is configured to perform integral operation of the speed signal V, and outputs a value of an integral. The drive computation block 9 adds a value that is obtained from the proportional operation element 106' by multiplying a speed signal V' by the constant of proportionality, and a value obtained by integrating the speed signal V together to generate a corrected speed signal. Alternatively, as illustrated in FIG. 2O, the drive computation block 9 may use only the proportional operation element 106' to generate a corrected speed signal V'.

Figure 2P:
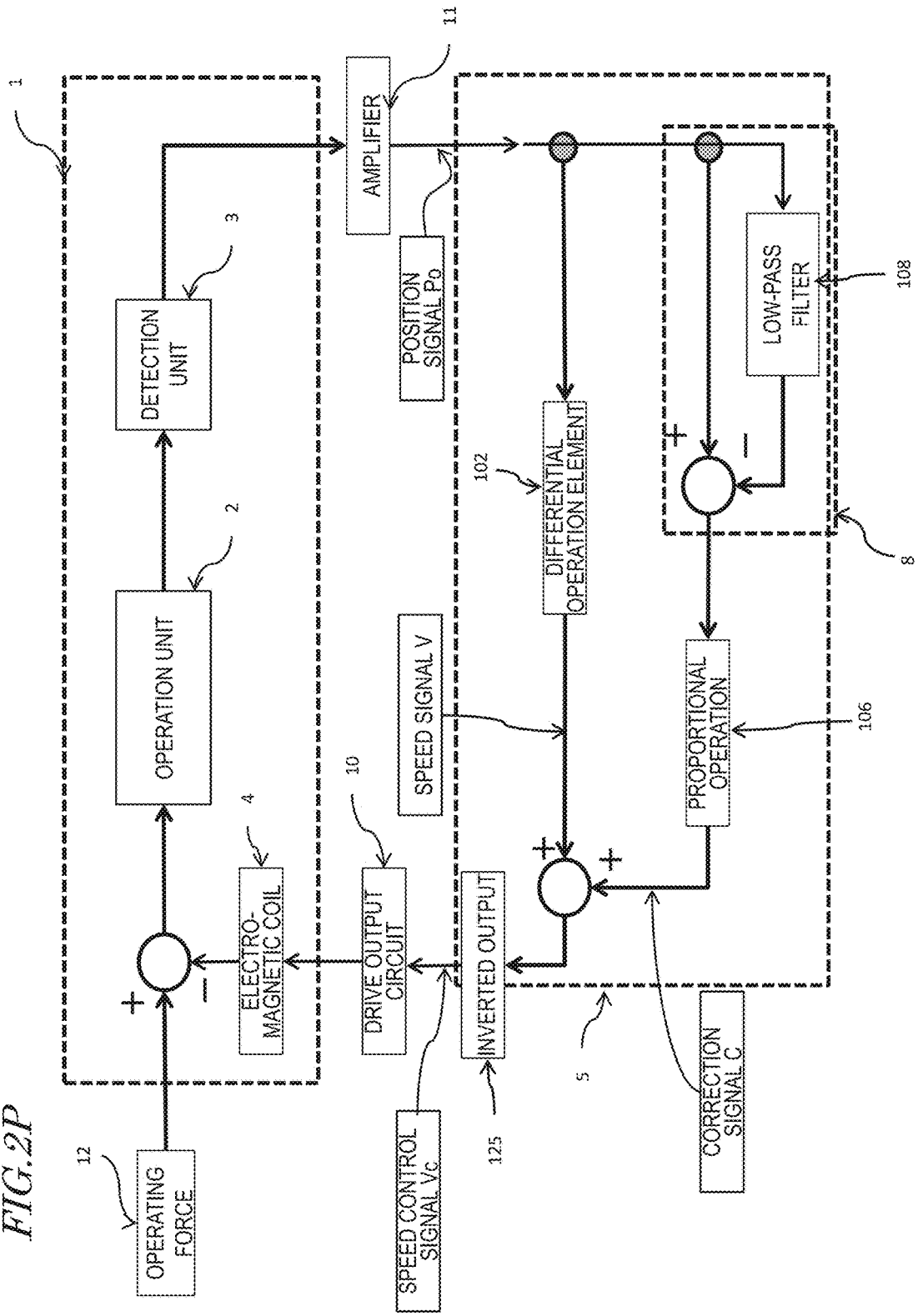
FIG. 2P is a diagram for illustrating yet another specific configuration example of the input/output operation device according to the first embodiment.

Moreover, in the above-mentioned modes, the input/output operation device presents the viscosity perception to the operator by driving the operation unit 2 in the direction opposite to the direction in which the operation unit 2 is displaced by the operator. In contrast, as illustrated in FIG. 2P, the control circuit may include an inverted output unit 125, which is configured to invert a signal obtained by adding the speed signal V and the correction signal C together to output the inverted signal. As a result, the control circuit 5 generates a speed control signal for driving the operation unit 2 in the same direction as the direction in which the operation unit 2 is displaced. According to this configuration, the input/output operation device can drive the operation unit 2 so as to assist the operation of the operator.

Figure 2R:
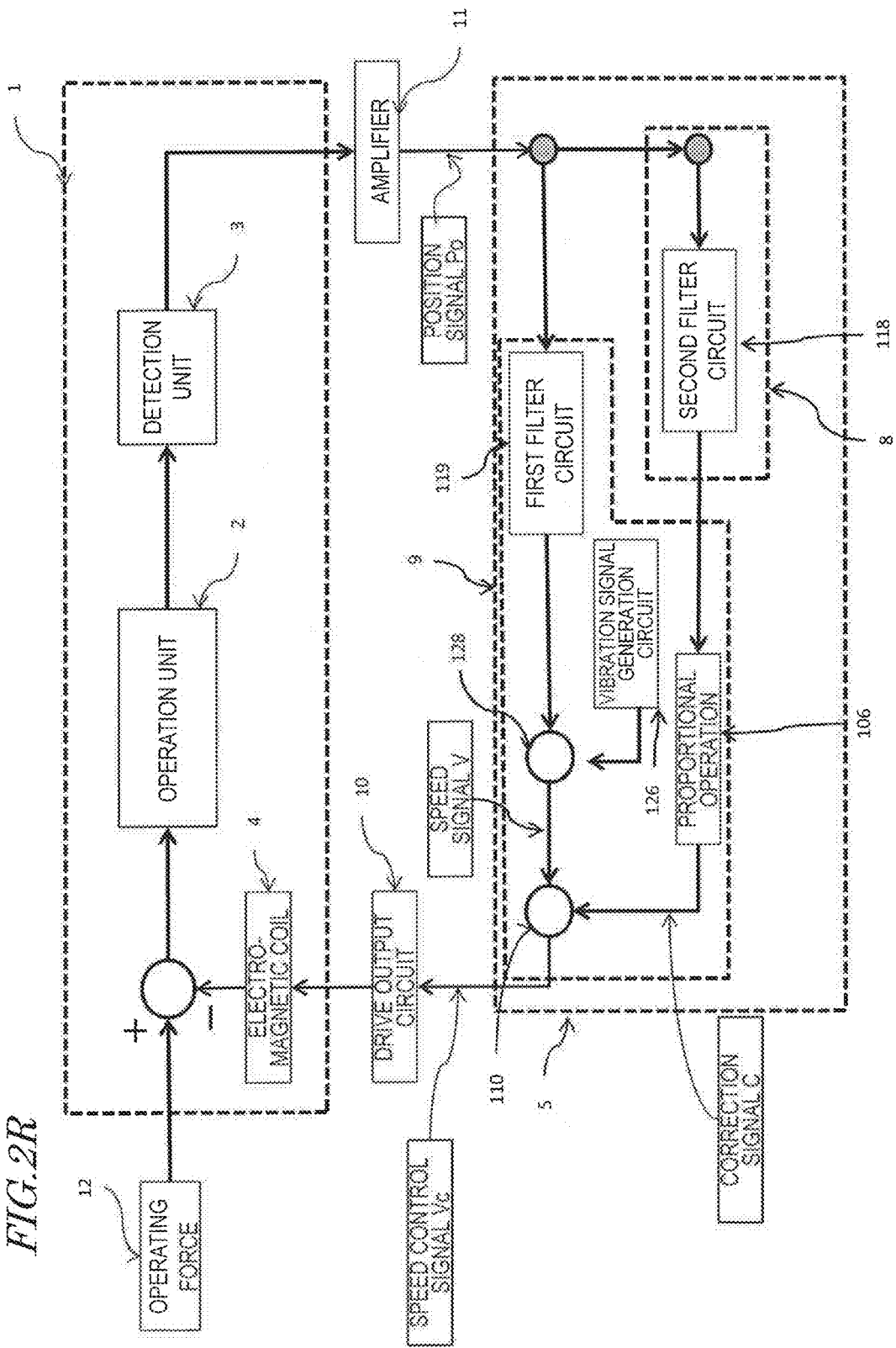
FIG. 2R is a diagram for illustrating yet another specific configuration example of the input/output operation device according to the first embodiment.

Moreover, as described above with reference to FIG. 2A and FIG. 2B, the input/output operation device according to the first embodiment can present a tactile sensation and sound to the operator by vibrating the operation unit 2. For example, as illustrated in FIG. 2Q, the drive computation block 9 may further include a vibration signal generation circuit 126 and an adder 127. The vibration signal generation circuit 126 is configured to generate a vibration signal of about several hundred Hz for vibrating the operation unit 2 so as to present a tactile sensation to the hand or the palm of the operator. The adder 127 is configured to add the vibration signal to the position signal Po to output the result to the first filter circuit 119. The lower cutoff frequency fc1 of the first filter circuit 119 is higher than the lower cutoff frequency fc2 of the second filter circuit 118, and hence the first filter circuit 119 outputs the result as the speed signal V without cutting off components of the vibration signal. Alternatively, as illustrated in FIG. 2R, the vibration signal generated by the vibration signal generation circuit 126 may be added to the speed signal V obtained from the first filter circuit 119.

The correction signal C is added to the thus-generated speed signal V, and the drive output circuit 10 drives the operation unit 2 using the generated speed control signal Vc, with the result that the operator can feel vibrations from the operation unit 2. The tactile sensation caused by the vibration felt by the operator may be different depending on a waveform and a frequency of the vibration signal. The vibration signal generated by the vibration signal generation circuit 126 may be constant, or may be different depending on the position of the operation unit 2 and a movement speed of the operation unit 2, that is, the position signal Po and the speed signal V. Moreover, the vibration signal generation circuit 126 may generate, in place of the vibration signal for presenting the tactile sensation, or in addition to the vibration signal for presenting the tactile sensation, a vibration signal having a frequency in an audible range.

As described above, the second filter circuit 118 mainly generates a signal for generating a force for providing a feeling of a load to an operation of the operation unit 2 or a force for providing a feeling of an assist. Such signal has a frequency corresponding to an operation speed of the operator, and generally has a frequency of about several tens of Hz. Therefore, when the above-mentioned signal for presenting a tactile sensation and sound is superimposed on the signal that is to pass or has passed through the second filter circuit 118, the signal passes through the second filter circuit 118 included in a closed loop of the control. As a result, the signal components for presenting the tactile sensation and the sound are disadvantageously removed, and it may be difficult to perform appropriate control in some cases. In contrast, according to the first embodiment, the first filter circuit 119 can be set to have such lower cutoff frequency as to transmit the signal components for presenting the tactile sensation and the sound. In other words, according to the first embodiment, the control on the movement of the operation unit 2 and the control on the vibration of the operation unit 2 can be achieved, and more comfortable operation feeling can be presented to the operator.

Second Embodiment

Figure 3A:
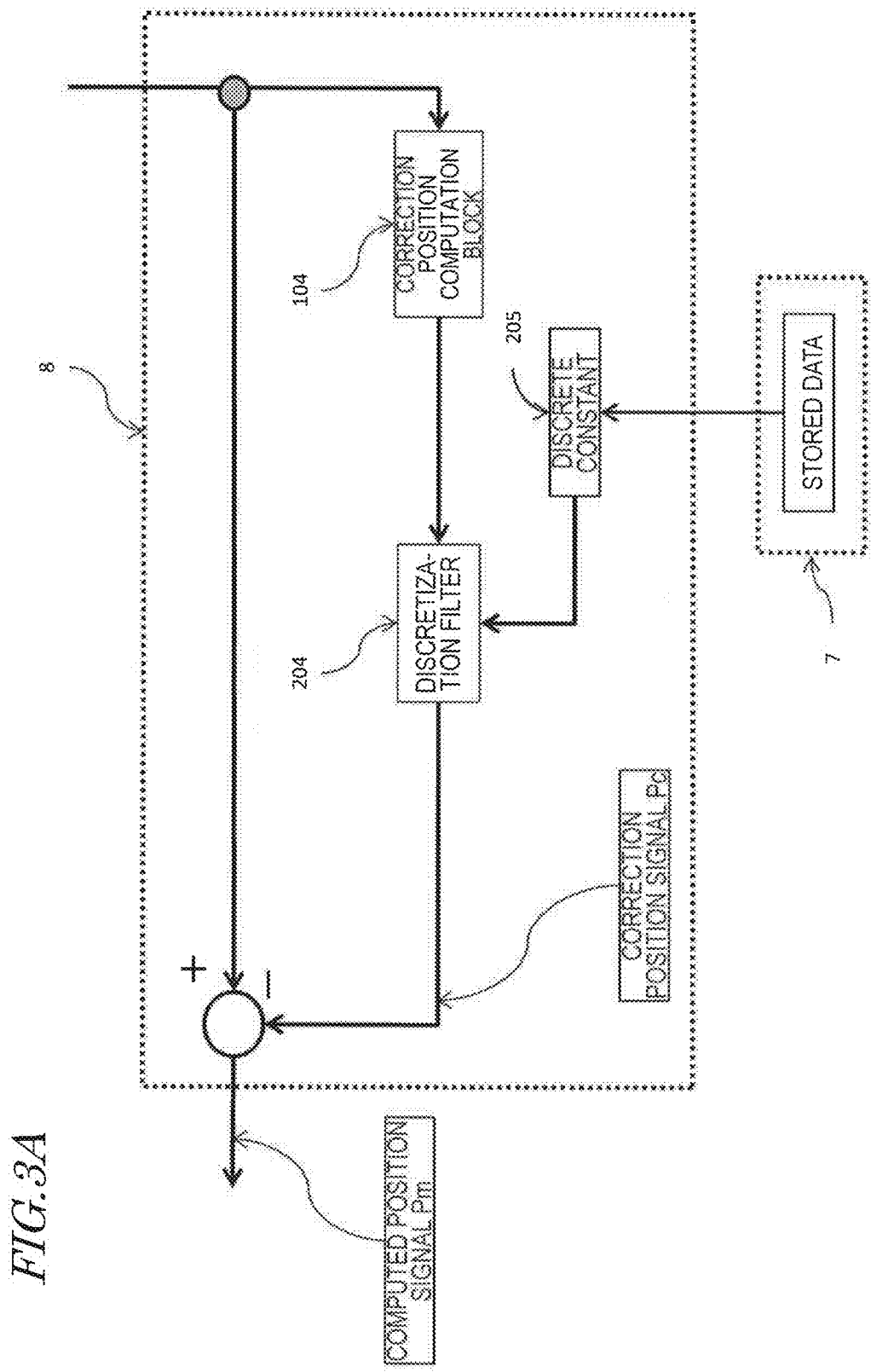
FIG. 3A is a diagram for illustrating a configuration example of an input/output operation device according to a second embodiment of this disclosure.

An input/output operation device according to a second embodiment of this disclosure presents a ratcheting sensation. In FIG. 3A, a configuration of a position computation block 8 of the input/output operation device according to the second embodiment is illustrated. The position computation block 8 includes a correction position computation block 104 and a discretization filter 204. The filtered position signal Pf, which is obtained from the correction position computation block 104, is caused to pass through the discretization filter 204 so that discretization operation is performed on the filtered position signal Pf. As a result, a correction position signal Pc having a value that is changed in steps, that is, discretely with respect to the position signal Po is generated. An interval between stepped or discrete values of the correction position signal Pc is used for the operation by setting a value set in the memory 7 as a discrete constant 205.

Figure 3B:
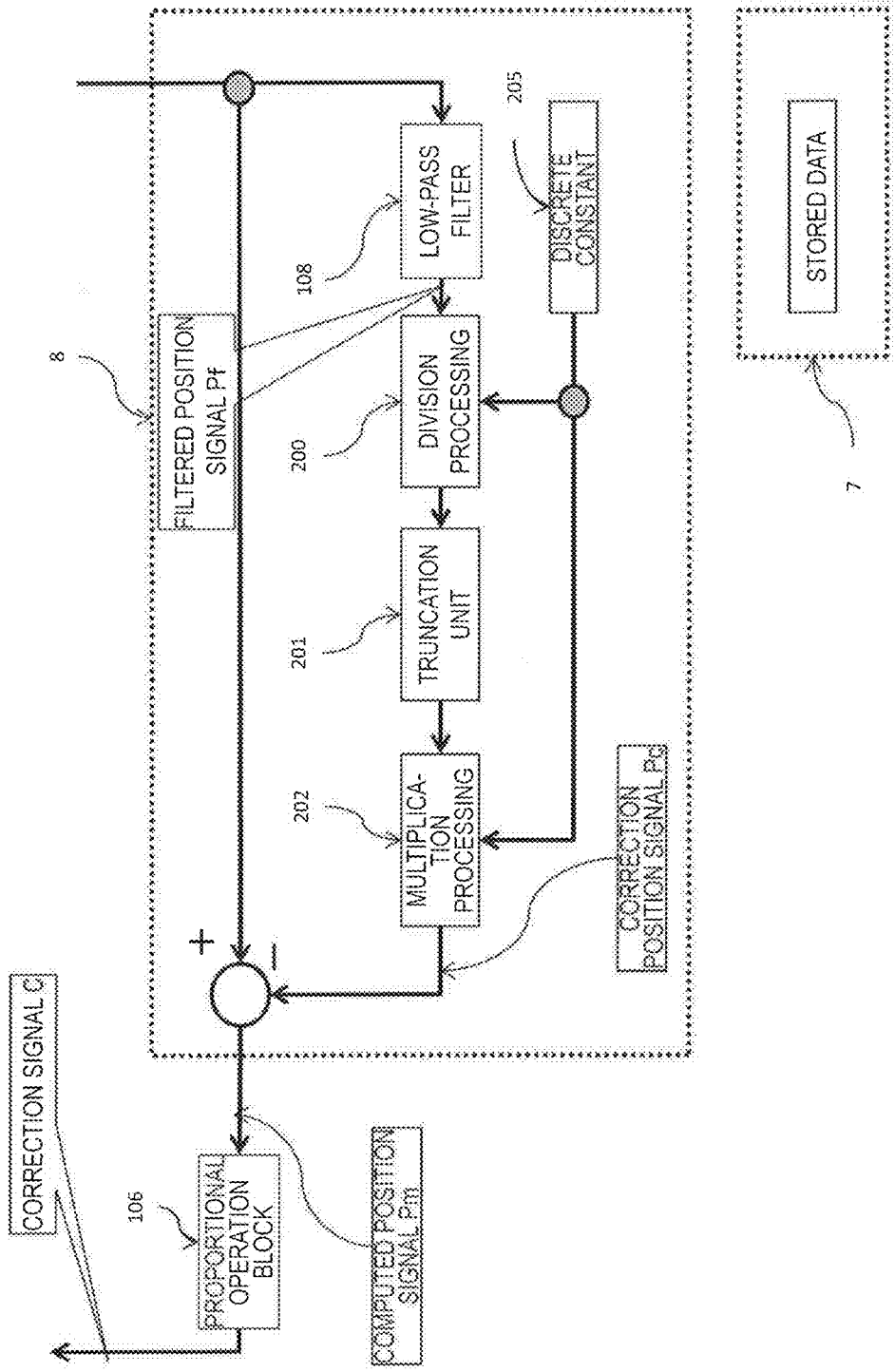
FIG. 3B is a diagram for illustrating a specific configuration example of the input/output operation device according to the second embodiment.

In FIG. 3B, a specific example of the position computation block 8 is illustrated. The position computation block 8 includes a low-pass filter 108, a division processor 200, a truncation unit 201, and a multiplication processor 202. The low-pass filter 108 corresponds to the correction position computation block 104, and the division processor 200, the truncation unit 201, and the multiplication processor 202 correspond to the discretization filter 204.

The position signal Po is caused to pass through the low-pass filter 108 to generate the filtered position signal Pf. The filtered position signal Pf is input to the division processor 200, and division is performed using the discrete constant 205. The truncation unit 201 performs round-up or round-down processing based on a quotient obtained by the division. For example, the quotient is truncated by rounding down when the first decimal place is 0 to 4, and rounding up when the first decimal place is 5 to 9. The multiplication processor 202 receives the truncated quotient from the truncation unit 201, multiplies the truncated quotient by the discrete constant 205, and outputs the result as the correction position signal Pc.

A relationship between the position signal Po and the correction position signal Pc is shown in FIG. 3C. As shown in FIG. 3C, the correction position signal Pc has stepped or discrete values. A correction position signal Pc1 is output when the position signal Po is between P0 and P1. Similarly, a correction position signal Pc2 is output when the position signal Po is between P1 and P2, and a correction position signal Pc3 is output when the position signal Po is between P2 and P3.

As in the first embodiment, the generated correction position signal Pc is added to the position signal Po to generate the computed position signal Pm.

In FIG. 3D, a relationship among the position signal Po, the filtered position signal Pf, and the correction position signal Pc is shown. The filtered position signal Pf is continuous as indicated by the thin broken line, but as a result of generating the correction position signal Pc through the round-up and round-down processing, a target point 206 indicated by the broken circle is set for the position signal Po. As shown in FIG. 3D, the operator feels a reaction force by being pulled back to the target point 206 with respect to the operation position, and can feel a change in load because the load is the minimum when the target point 206 is switched to the next target point. Therefore, the operator can perceive the change in load as the ratcheting sensation.

Third Embodiment

Figure 4A:
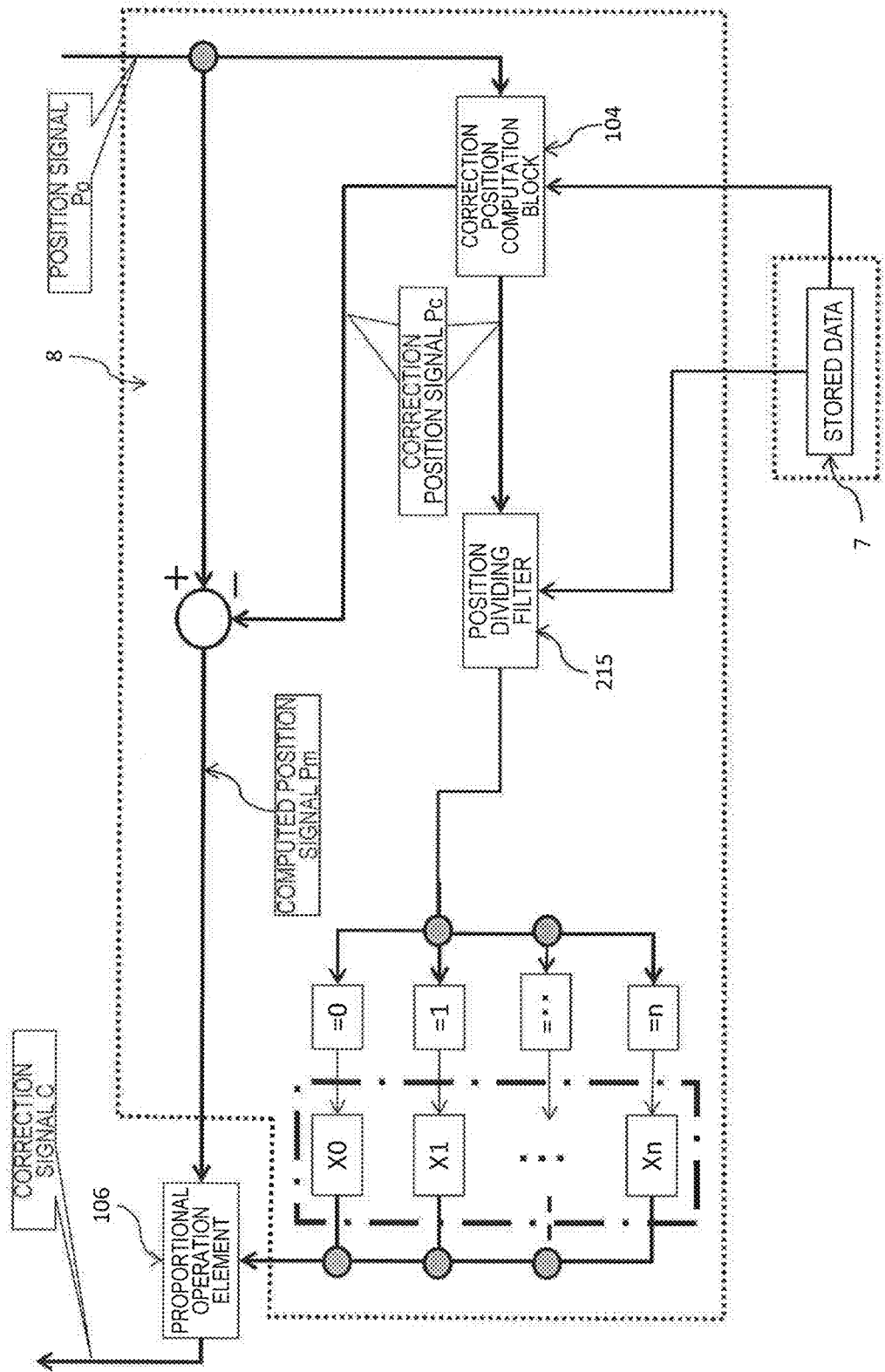
FIG. 4A is a diagram for illustrating a configuration example of an input/output operation device according to a third embodiment of this disclosure.

An input/output operation device according to a third embodiment of this disclosure also presents a ratcheting sensation. In FIG. 4A, a configuration of a position computation block 8 of the input/output operation device according to the third embodiment is illustrated. The input/output operation device according to the third embodiment is different from the input/output operation device according to the second embodiment in that target points are not discrete.

As illustrated in FIG. 4A, the position computation block 8 of the input/output operation device according to the third embodiment includes a correction position computation block 104 and a position dividing filter 215. As in the first embodiment, a position signal Po is caused to pass through the correction position computation block 104 to be output as a correction position signal Pc, and a difference between the correction position signal Pc and the position signal Po is determined to obtain a computed position signal Pm. As a result, as in the first embodiment, driving that is capable of presenting viscosity perception is performed.

The correction position signal Pc is also input to the position dividing filter 215. In the position dividing filter 215, a region of the position signal is divided depending on a value specified from the memory 7 depending on a value of the correction position signal Pc, and output of the correction signal C is changed by setting, in the drive computation block 9, the set value specified from the memory 7 depending on the divided region.

Figure 4B:
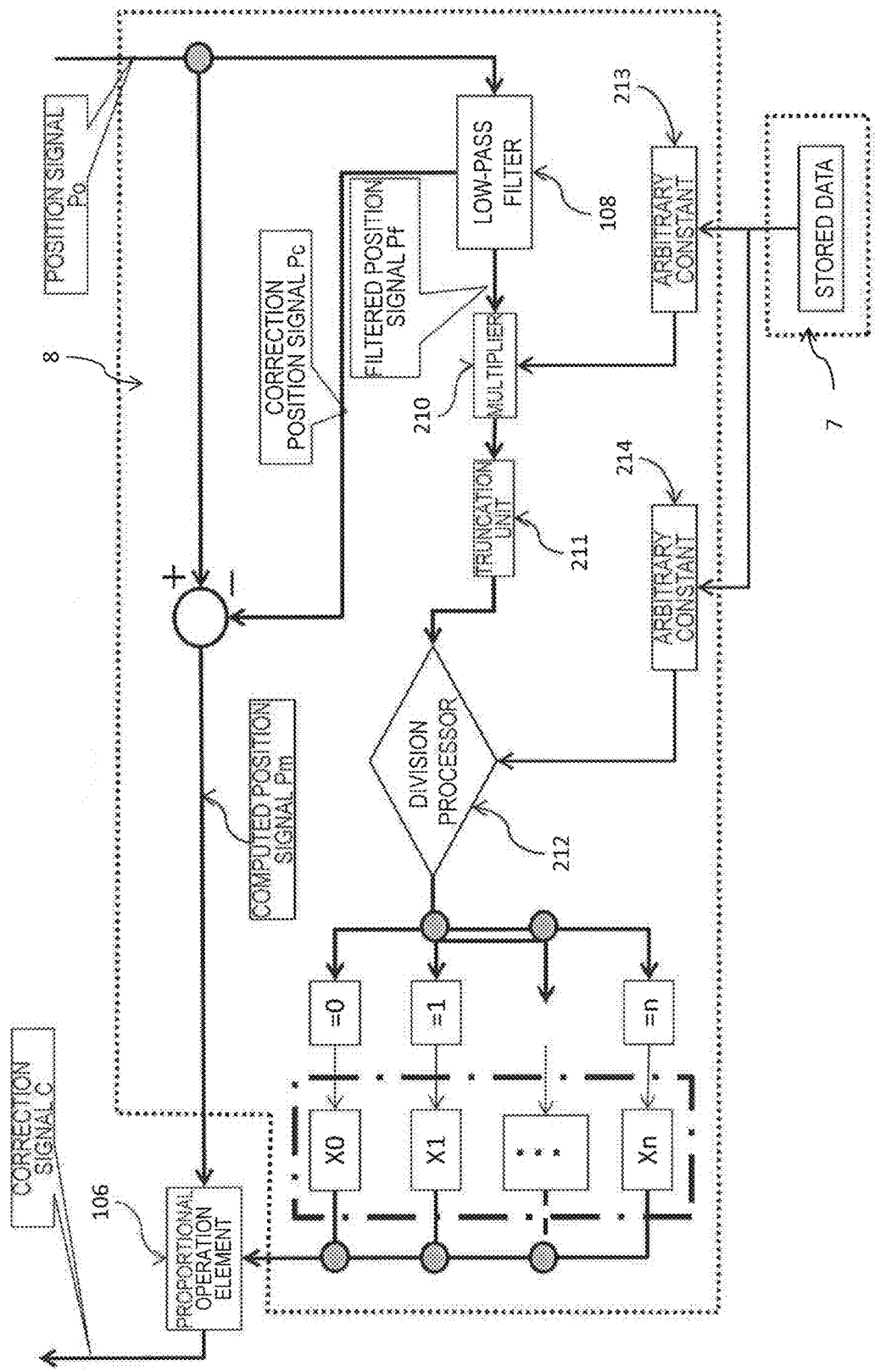
FIG. 4B is a diagram for illustrating a specific configuration example of the input/output operation device according to the third embodiment.

In FIG. 4B, a specific example of the position computation block 8 of the input/output operation device according to the third embodiment is illustrated. As in the first embodiment, the position computation block 8 causes the position signal Po to pass through the low-pass filter 108, which is the correction position computation block 104, to generate the filtered position signal Pf.

A multiplier 210 multiplies the filtered position signal Pf by an arbitrary constant 213 specified by the memory 7. The obtained signal is truncated by a truncation unit 211, and then divided by an arbitrary constant 214 in a division processor 212 to obtain a remainder value. The arbitrary constant 214 is the number of regions by which the position signal Po is divided. The setting includes a case where the remainder value is 0, and hence a value that is smaller than the number of regions by 1 is actually set.

Depending on the remainder value, proportional coefficients $X0, X1, \ldots Xn$ is set to the proportional operation element 106, which is stored in the memory 7 in advance. By setting a different value to the proportional operation element 106, the correction signal C is changed, and the output of the load is changed. As a result, the correction signal C (magnitude of the second speed) is changed discontinuously and periodically. The output correction signal C is changed depending on the correction position signal Pc, and hence a sensation of ratcheting is similarly obtained in a manner different from the discretization in the second embodiment.

Figure 4C:
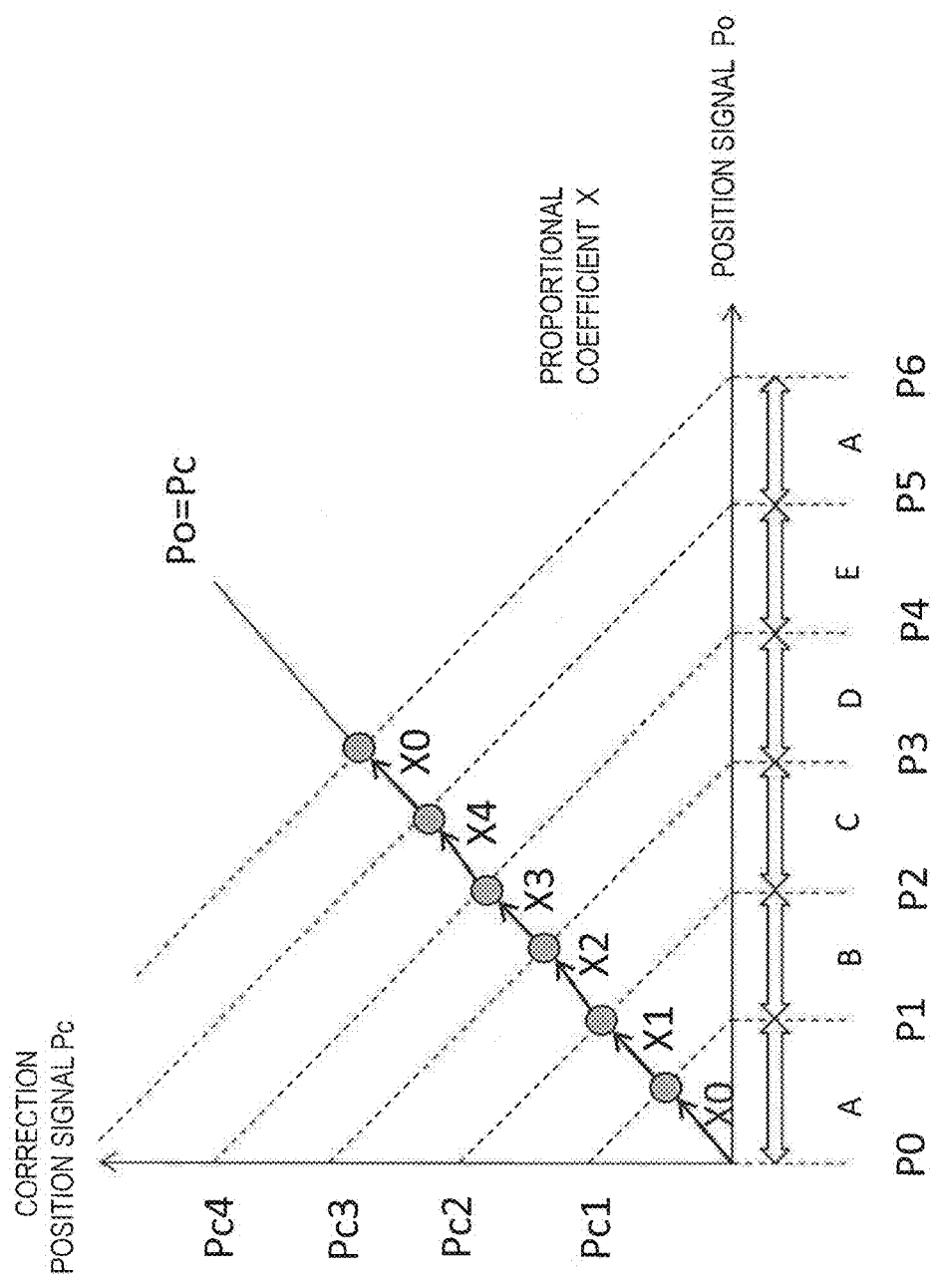
FIG. 4C is a graph for schematically showing a position signal Po and a correction position signal Pc in the input/output operation device illustrated in FIG. 4B.

In FIG. 4C, there is shown a relationship between the position signal Po and the correction position signal Pc when the number of divided regions is 5. When the position signal Po is between P0 and P1, the remainder is 0 to fall in a region A, and a value X0 of the proportional operation element 106 is set. When the position signal Po is between P1 and P2, the remainder is 1 to fall in a region B, and a value X1 of the proportional operation element 106 is set. When the position signal Po is between P2 and P3, the remainder is 2 to fall in a region C, and a value X2 of the proportional operation element 106 is set. When the position signal Po is between P3 and P4, the remainder is 3 to fall in a region D, and a value X3 of the proportional operation element 106 is set. When the position signal Po is between P4 and P5, the remainder is 4 to fall in a region E, and a value X4 of the proportional operation element 106 is set. When the position signal Po is in the next range between P5 and P6, the remainder is again 0 to fall in a region A, and the value X0 of the proportional operation element 106 is set. By thus providing at least two divided regions, the correction signal C as an amount of the load is changed. Therefore, the load felt by the operator is changed, and the sensation of ratcheting can be obtained.

When the operation unit may be operated circularly, for example, the region to be divided may be divided depending on a position angle of the operation unit. For example, angles of from 0° to 10° of the operation unit may be set as the region A, and angles of from 11° to 20° may be set as the region B. In FIG. 4D, a relationship among the position signal Po, the correction position signal Pc, and the correction signal C while the operation unit is being operated is shown specifically. The correction position signal Pc is plotted as indicated by the thin broken line, and is divided by the proportional coefficients X0 to X4 in ranges sectioned into respective regions, to thereby generate the correction signal C. A constant of the multiplier 210 and a constant of the division processor 212, which are used in the operations, may be stored in the memory 7.

Fourth Embodiment

Figure 5A:
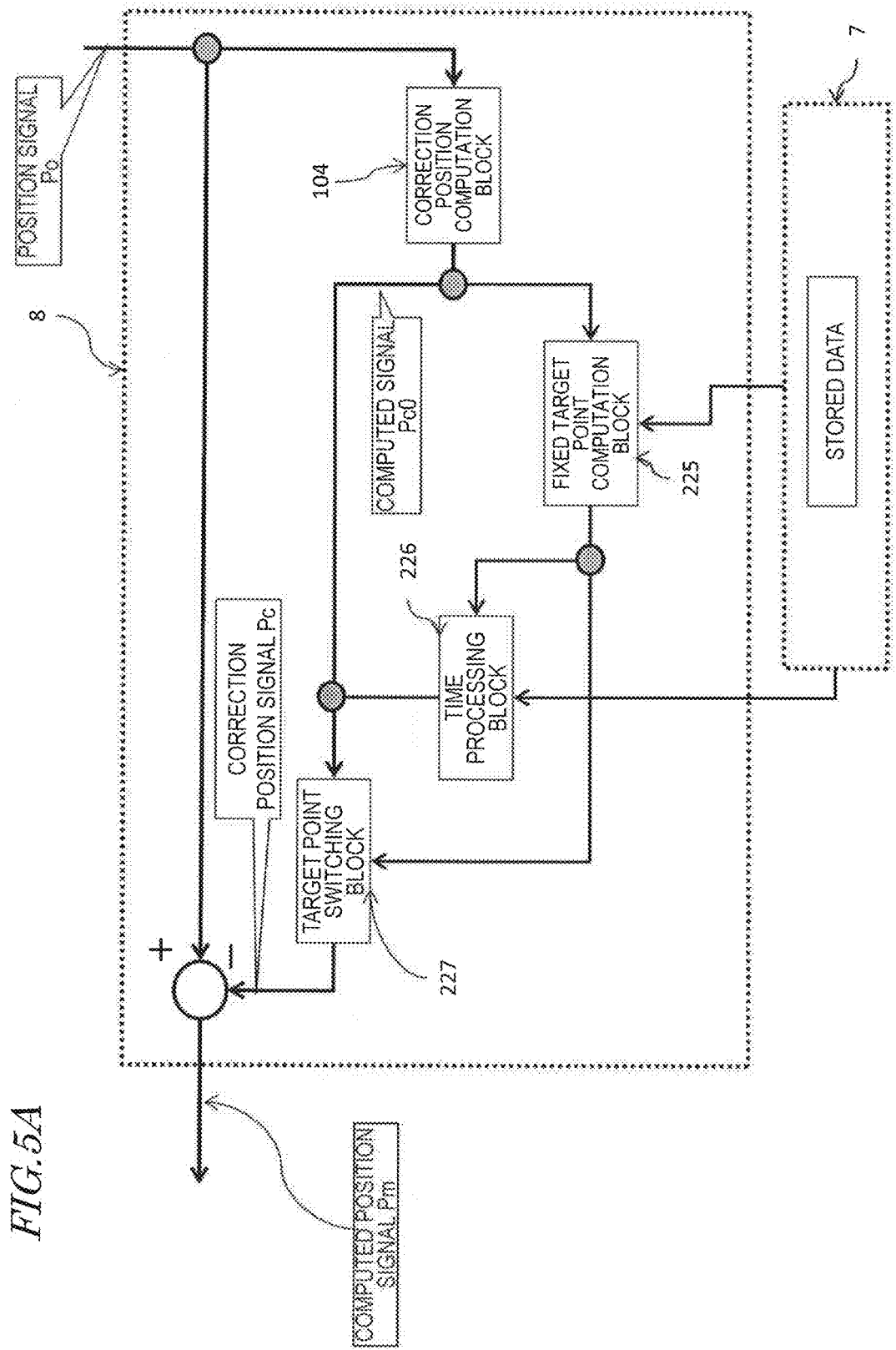
FIG. 5A is a diagram for illustrating a configuration example of an input/output operation device according to a fourth embodiment of this disclosure.

An input/output operation device according to a fourth embodiment of this disclosure also presents a ratcheting sensation. In FIG. 5A, a configuration of a position computation block 8 of the input/output operation device according to the fourth embodiment is illustrated. The input/output operation device according to the fourth embodiment is different from the input/output operation device according to each of the second and third embodiments in that a sensation of ratcheting is obtained by restricting time.

The position computation block 8 of the input/output operation device according to the fourth embodiment includes a correction position computation block 104, a fixed target point computation block 225, a time processing block 226, and a target point switching block 227.

A computed signal Pc0, which is obtained by causing the position signal Po to pass through the correction position computation block 104, is input to the fixed target point computation block 225 and the target point switching block 227. The fixed target point computation block 225 measures an amount of change of the computed signal Pc0, and stores the computed signal Pc0 in the target point switching block 227 so that, when the amount of change has reached a value of data set in the memory 7, the computed signal Pc0 has a value of a fixed target point (value). At the same time, the fixed target point computation block 225 starts measuring time for setting the target value of the time processing block 226. At this time, the correction position signal Pc, which is output from the target point switching block 227, is determined to be a constant value. However, when the operator cannot respond immediately to a load and continues to operate the operation unit, a change occurs in the position signal Po. The computed position signal Pm of the correction position signal Pc that has been set to a fixed point is output, and is computed in the drive computation block 9 to be output as the correction signal C, to thereby generate a load force.

In the time processing block 226, when the time period set in the memory 7 has been reached, the computed signal Pc0 is caused to pass through the target point switching block 227 to attain a state in which the correction position signal Pc and the computed signal Pc0 are equal to each other. At a timing when the correction position signal Pc becomes equal to the computed signal Pc0, the load felt by the operator is reduced in turn, with the result that the sensation of ratcheting can be obtained.

Figure 5B:
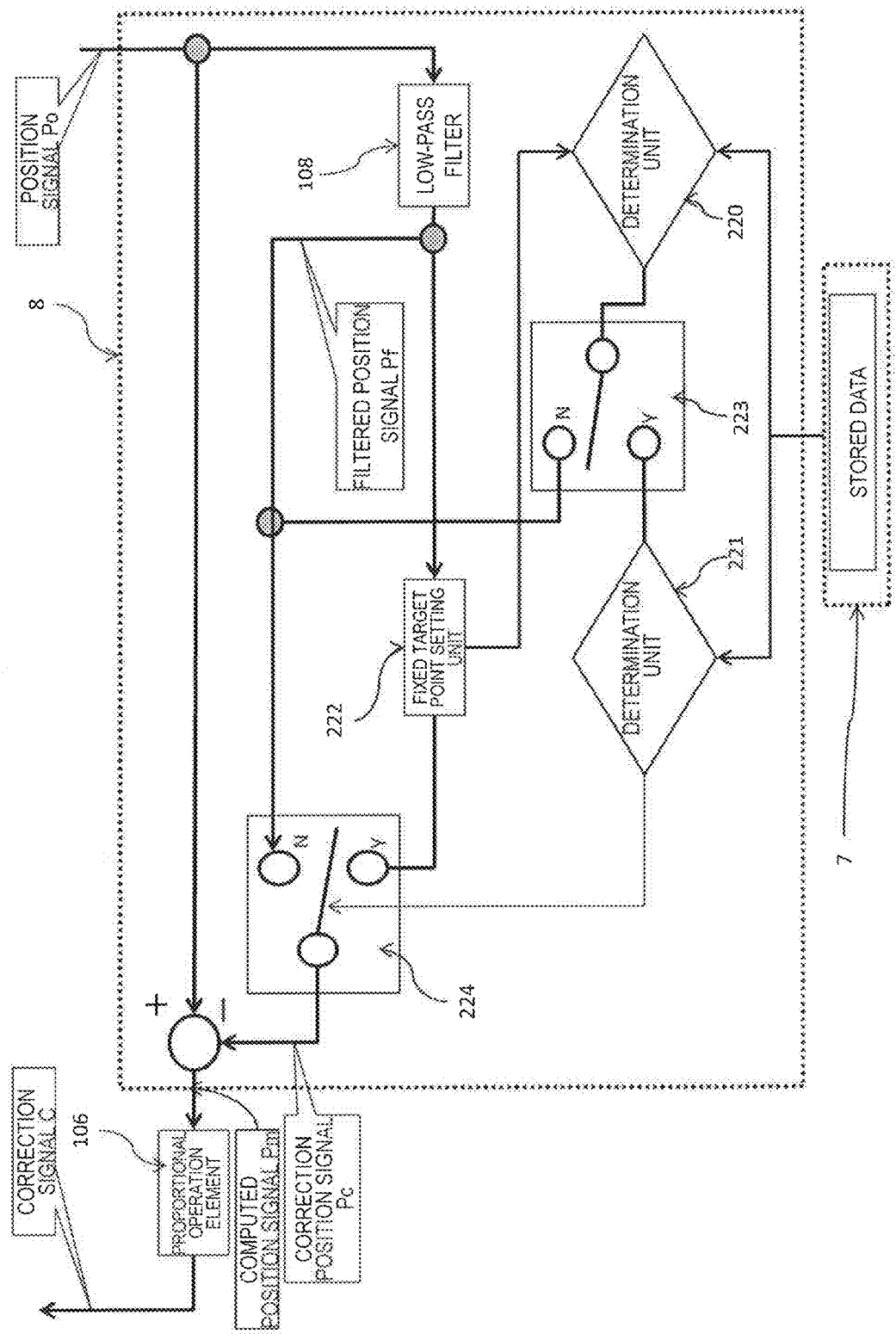
FIG. 5B is a diagram for illustrating a specific configuration example of the input/output operation device according to the fourth embodiment.

In FIG. 5B, a specific example of the position computation block 8 of the input/output operation device according to the fourth embodiment is illustrated.

A filtered position signal Pf, which is obtained by causing a position signal Po to pass through a low-pass filter 108, which is the correction position computation block 104, is input to a fixed target point setting unit 222. A determination unit 220 changes a determination switch 223 from N to Y when a value of the filtered position signal Pf is a specified distance (=C) called from the memory 7 or more.

A determination unit 221 measures a set time period called from the memory 7, and changes a determination switch 224 from N to Y within the set time period. As a result, a value determined in the fixed target point setting unit 222 is set as the correction position signal Pc. When the set time period has elapsed, the determination switch 224 is changed from Y to N, and switching is made from the value determined in the fixed target point setting unit 222 to the filtered position signal Pf. Moreover, the determination switch 223 is also changed from Y to N.

Figure 5C:
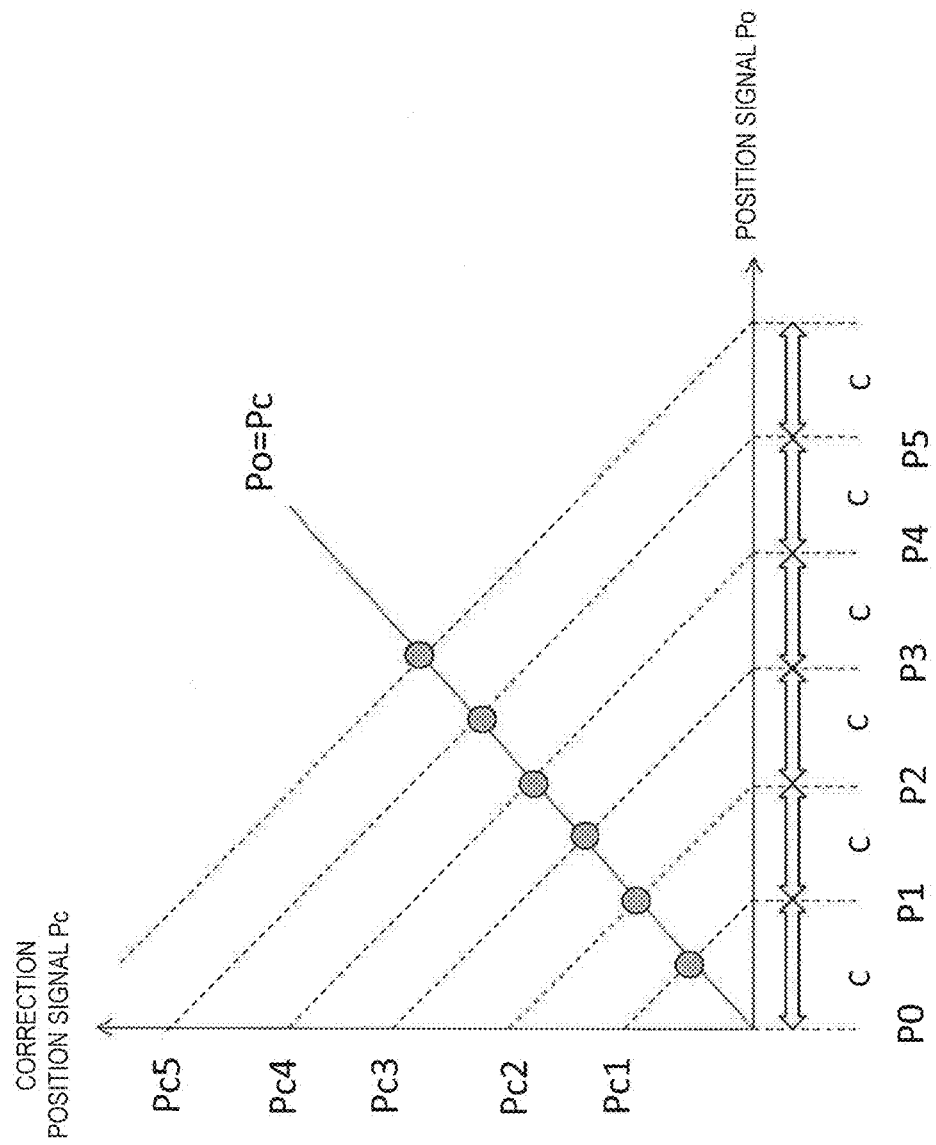
FIG. 5C is a graph for schematically showing a position signal Po and a correction position signal Pc in the input/output operation device illustrated in FIG. 5B.

In FIG. 5C, a relationship between the position signal Po and the correction position signal Pc is shown. When the position signal Po is P0, and when a movement is made by a distance C, the correction position signal Pc becomes Pc1, and the fixed target point setting unit 222 sets the target point to Pc1 only within a specified time period Δt. At this time, the operator cannot respond immediately and continues to operate the operation unit, and hence a load is generated when the target point is set to Pc1. When the time period Δt has elapsed, the correction position signal Pc is output as the filtered position signal Pf regardless of the value of the fixed target point setting unit 222.

In FIG. 5D, the position signal Po and the correction position signal Pc, which are changed with time, are shown. The thick broken circle indicates the correction position signal Pc. When a distance from a previous value determined by the fixed target point setting unit 222 becomes C, the fixed target point setting unit 222 is fixed to the value of the target point set by the fixed target point setting unit for the time period Δt, which is the specified time period, to generate the correction position signal Pc. In other words, there is generated a speed control signal for repeating stopping, for a predetermined time period, the displacement of the operation unit at a displacement position after the operation unit is displaced by a predetermined distance. The operator moves the operation unit 2 toward the target position (target point). Even when the operation unit 2 has reached the target position, the operator cannot stop the operation unit 2 immediately, and the operation unit 2 is disadvantageously moved past the target position. In this case, when the operation unit 2 is driven in the direction opposite to the movement direction, the operator feels a heavy load. Further, when the time period Δt has elapsed, the load becomes 0. As a result, the change in load is presented as a sensation like ratcheting.

Fifth Embodiment

Figure 6A:
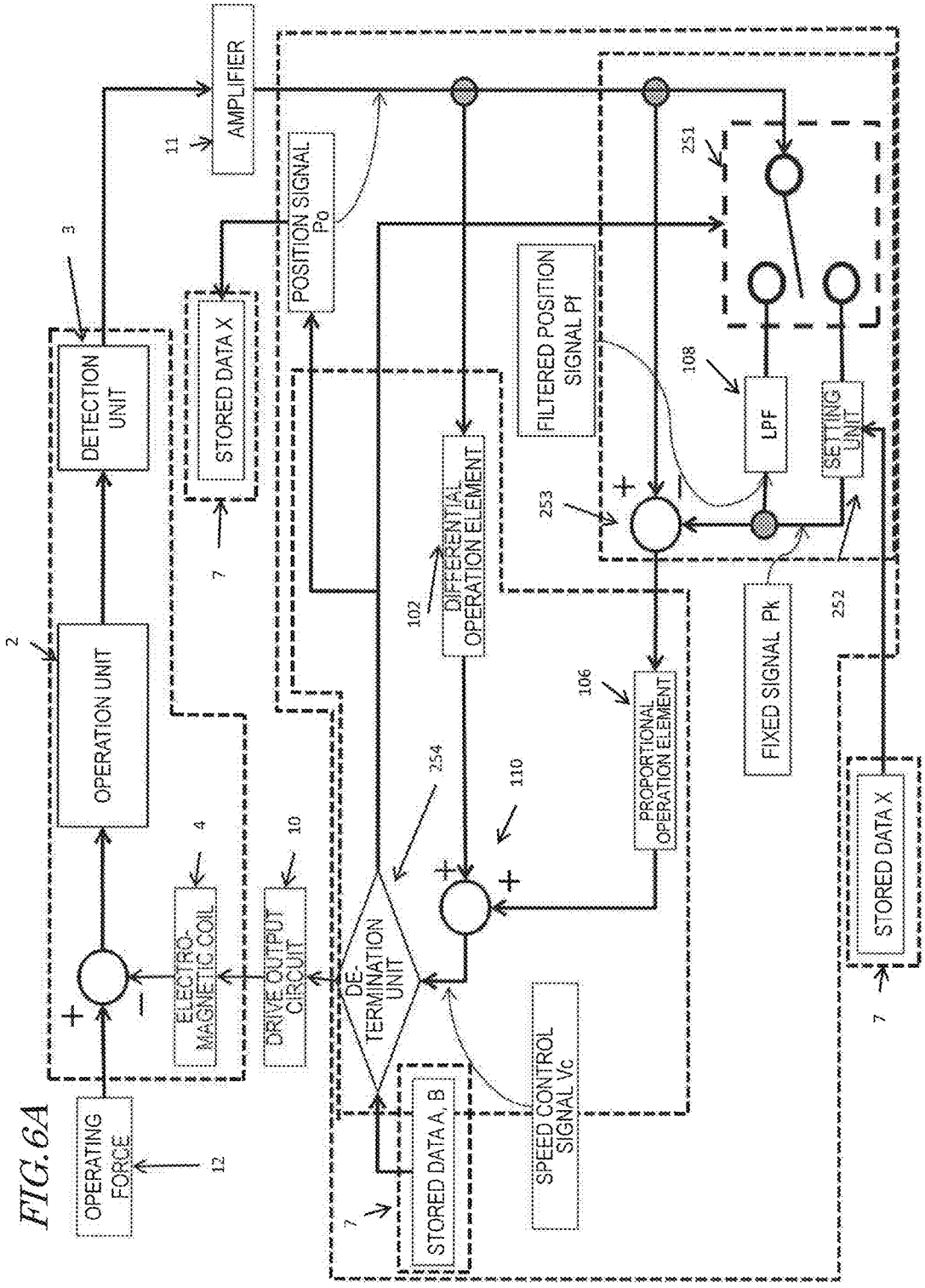
FIG. 6A is a diagram for illustrating a configuration example of an input/output operation device according to a fifth embodiment of this disclosure.

An input/output operation device according to a fifth embodiment of this disclosure also presents a ratcheting sensation. In FIG. 6A, a configuration of the input/output operation device according to the fifth embodiment is illustrated. The input/output operation device according to the fifth embodiment moves, with respect to a far target position, the operation unit to the target position accurately and fast. Therefore, the input/output operation device presents viscosity perception when the operation unit is operated fast, and presents a ratcheting sensation when the operation unit approaches the target position.

In FIG. 6A, a specific example of the input/output operation device according to the fifth embodiment is illustrated. As illustrated in FIG. 6A, a position computation block 8 of the input/output operation device according to the fifth embodiment includes a determination switch 251, a low-pass filter 108, a fixed target point setting unit 252, and a subtractor 253. A drive computation block 9 includes a differential operation element 102, a proportional operation element 106, an adder 110, and a determination unit 254. Moreover, the memory 7 is configured to store stored data A, stored data B, and stored data X. The memory 7 is configured to sequentially store a position signal Po as the stored data X. Moreover, the memory 7 is configured to store predetermined values as the stored data A and the stored data B. The stored data A has a value that is larger than that of the stored data B.

The position computation block 8 operates on the basis of output from the determination unit 254. Specifically, the determination unit 254 is configured to compare the speed control signal Vc with the stored data A or the stored data B stored in the memory 7. In FIG. 6, two signals input to the subtractor 253 of the position computation block 8, and the speed control signal Vc are shown.

In an initial state, the determination unit 254 compares the speed control signal Vc and the stored data A. When the speed control signal Vc is larger than the stored data A, that is, when the operation unit 2 is operated at a high speed, the determination switch 251 selects so that the position signal Po is caused to pass through the low-pass filter 108 on the basis of a signal from the determination unit 254. As a result, a filtered position signal Pf is output from the low-pass filter 108. The subtractor 253 subtracts the filtered position signal Pf from the position signal Po, and outputs a computed position signal Pm. The proportional operation element 106 performs proportional operation on the computed position signal Pm, and outputs the result to the adder 110. The adder 110 adds the output from the proportional operation element 106 and a signal obtained by subjecting the position signal Po to differential operation, which is output from the differential operation element 102, together to generate the speed control signal Vc.

The determination unit 254 compares the speed control signal Vc and the stored data A, and when the speed control signal Vc is larger than the stored data A, outputs a signal to the determination switch 251 so that the determination switch 251 selects the low-pass filter 108. There may be adopted a configuration in which, when the speed control signal Vc is larger than the stored data A, the determination unit 254 does not output any signal, and the determination switch 251 selects the low-pass filter 108 when receiving no signal from the determination unit 254. In this manner, when the speed control signal Vc is larger than the stored data A, a control circuit 5 repeats the above-mentioned loop. As a result, the input/output operation device presents the viscosity perception to the operator.

When the operator lowers the movement speed of the operation unit 2 because the position of the operation unit 2 operated by the operator approaches the target position, the speed control signal Vc also becomes smaller. When the speed control signal Vc is smaller than the stored data A, or when the speed control signal Vc is the stored data A or lower, the determination unit 254 stores a position signal Po' at that time as the stored data X. The stored data X is input to the fixed target point setting unit 252. Moreover, on the basis of the output from the determination unit 254, the determination switch 251 selects the fixed target point setting unit 252. As a result, the position signal Po is not input to the low-pass filter 108, and the fixed target point setting unit 252 outputs the set stored data X as a fixed point signal Pk. The subtractor 253 subtracts the fixed point signal Pk from the position signal Po, and outputs a computed position signal Pm. The proportional operation element 106 performs proportional operation on the computed position signal Pm, and outputs the result to the adder 110. The adder 110 adds the output from the proportional operation element 106 and a signal obtained by subjecting the position signal Po to differential operation, which is output from the differential operation element 102, together to generate the speed control signal Vc.

As described above, when the speed control signal Vc is smaller than the stored data A, that is, when the movement speed of the operation unit 2 becomes lower because the operator moves the operation unit 2 to the vicinity of the target position, the speed control signal Vc is generated on the basis of the fixed point signal Pk. The fixed point signal Pk is based on the position signal Po' at the time when the speed control signal Vc is the stored data A or less, and the fixed point signal Pk is constant.

Subsequently, the determination unit 254 compares the speed control signal Vc and the stored data B. As shown in FIG. 6B, when the speed control signal Vc is smaller than the stored data B, a signal is output so that the determination switch 251 selects the fixed target point setting unit 252. Regardless of a change in position signal Po, the control circuit 5 generates the speed control signal Vc on the basis of the fixed point signal Pk based on the stored data X set by the fixed target point setting unit 252.

When the speed control signal Vc is larger than the stored data B, the determination unit 254 performs operation in the initial state. In other words, when the speed control signal Vc is larger than the stored data A, the determination switch 251 selects so as to cause the position signal Po to pass through the low-pass filter 108 on the basis of the signal from the determination unit 254.

As described above, the stored data B is set to be smaller than the stored data A, and the speed control signal Vc is generated on the basis of the fixed point signal Pk until the speed control signal Vc becomes larger than the stored data B. Therefore, when the operation unit 2 is operated to be moved away from the predetermined position based on the constant position signal Po', the speed control signal Vc for driving the operation unit 2 to be pulled back to the predetermined position based on the constant position signal Po' is generated. Therefore, the operation unit 2 is driven so as to be guided to the predetermined position based on the constant position signal Po', and the input/output operation device presents the ratcheting sensation to the operator.

As described above, according to the input/output device of the fifth embodiment, the viscosity perception and the ratcheting sensation may be switched over to be presented to the operator. Moreover, the viscosity perception and the ratcheting sensation are switched over using the stored data A and the stored data B having different values, resulting in realization of control with hysteresis in which a timing at which switching is made from the presentation of the viscosity perception to the presentation of the ratcheting sensation and a timing at which switching is made from the presentation of the ratcheting sensation to the presentation of the viscosity perception are different. For example, when the stored data B is larger than the stored data A, the viscosity perception is presented to the operator until the operation unit 2 approaches the target position, and when the operation unit 2 is moved to another target position, the ratcheting sensation is presented to the operator unless a large operation is performed. As a result, unless the operation unit 2 is operated with a clearly large force, a sensation that the operation unit 2 is hard to move to the new target position can be presented to the operator.

Sixth Embodiment

Figure 7A:
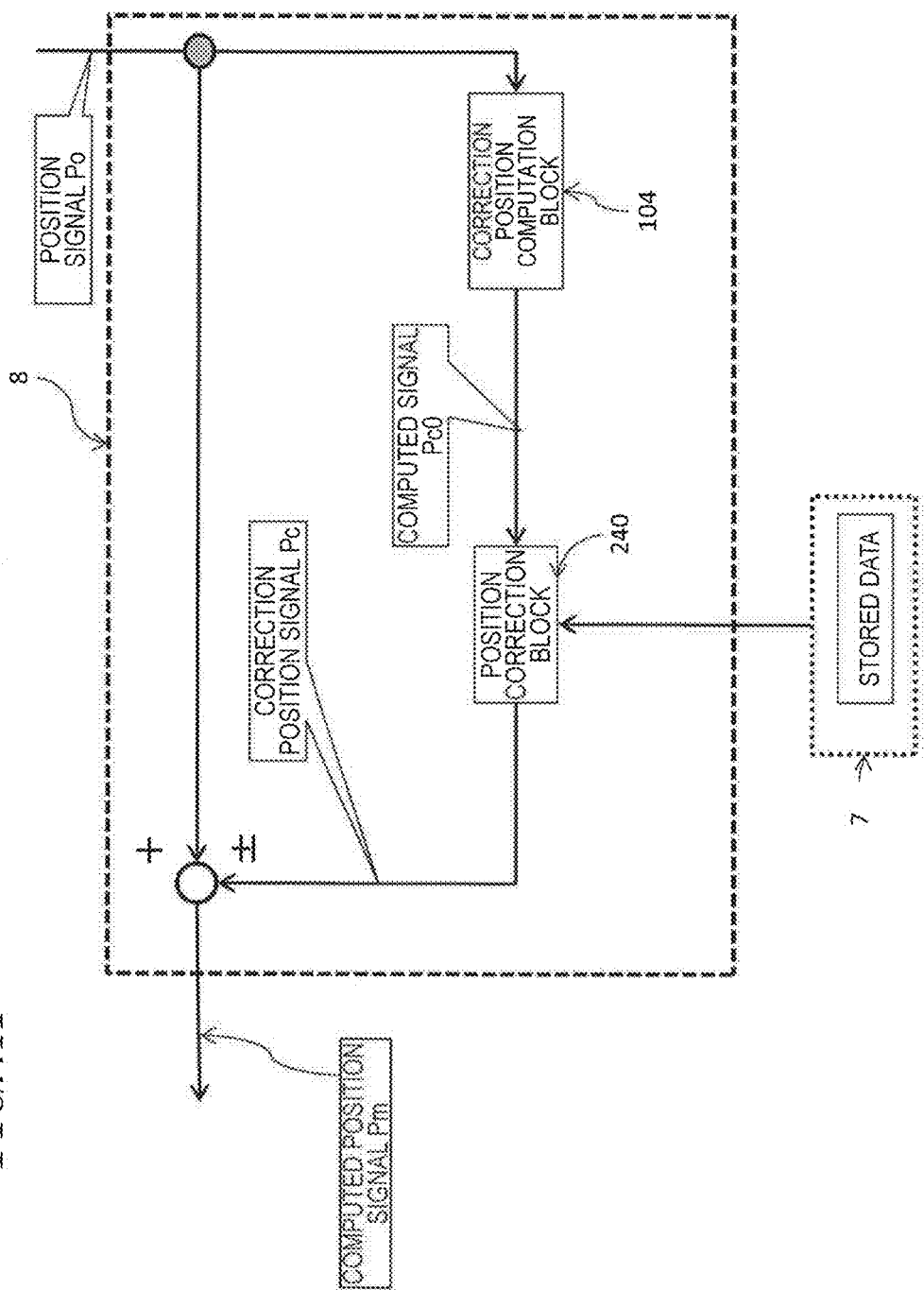
FIG. 7A is a diagram for illustrating a configuration example of an input/output operation device according to a sixth embodiment of this disclosure.

An input/output operation device according to a sixth embodiment of this disclosure presents a ragged tactile load to an operator. In FIG. 7A, a position computation block 8 of the input/output operation device according to the sixth embodiment is illustrated. A position signal Po is input to a correction position calculation block 104, and a generated computed signal Pc0 is input to a position correction block 240. The position correction block 240 determines processing of subtracting the computed signal Pc0 and processing of adding the computed signal Pc0, and outputs the result as the correction position signal Pc. The position signal Po and the correction position signal Pc are added or subtracted to generate the computed position signal Pm, and the computed position signal Pm passes through the proportional operation element 106 to change an output load as a correction signal C.

Figure 7B:
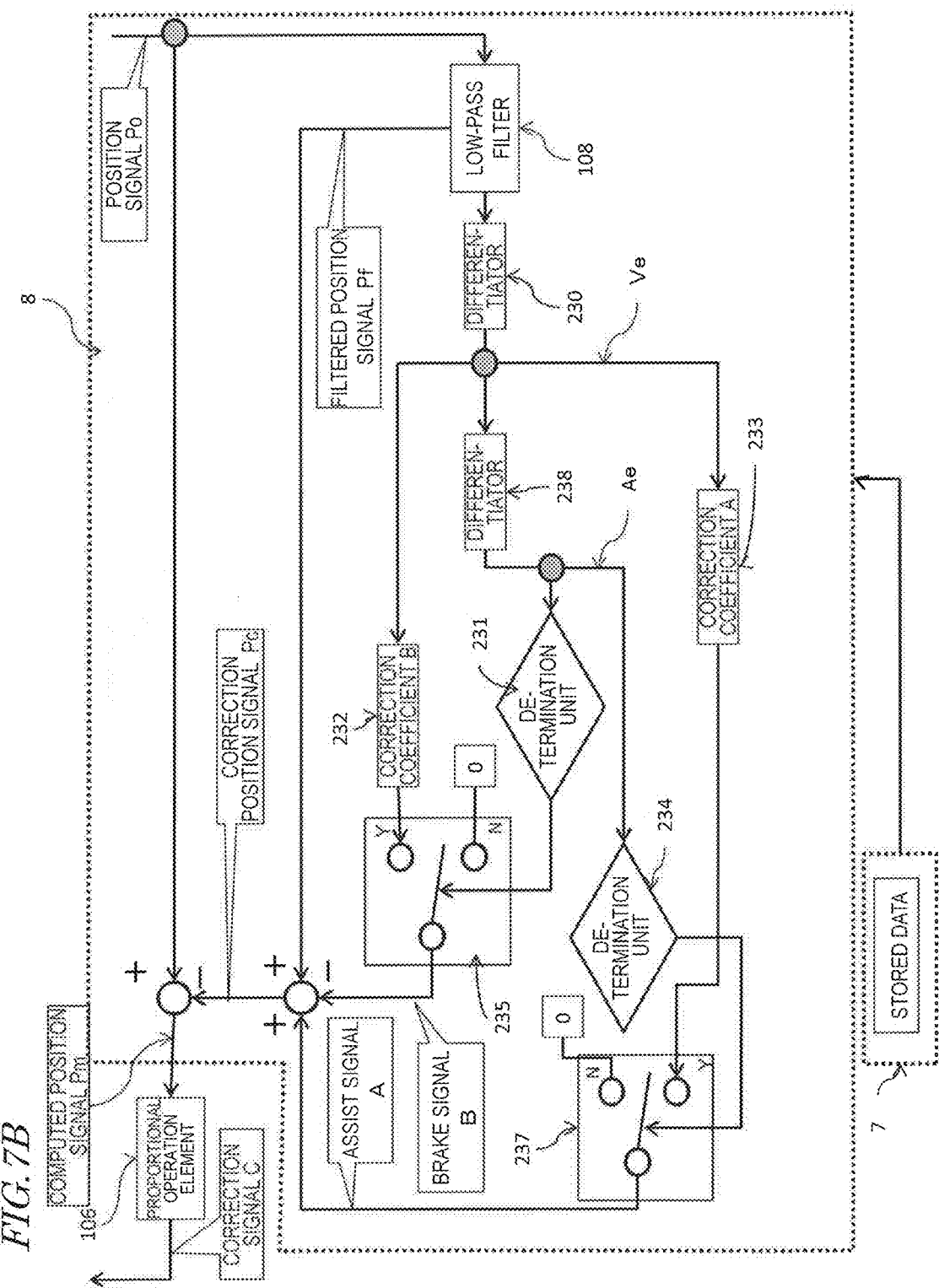
FIG. 7B is a diagram for illustrating a specific configuration example of the input/output operation device according to the sixth embodiment.

In FIG. 7B, a specific example of the position computation block 8 of the input/output operation device according to the sixth embodiment is illustrated.

A filtered position signal Pf is generated based on the position signal Po by causing the position signal Po to pass through the low-pass filter 108. A differentiator 230 differentiates the filtered position signal Pf with respect to time to generate a speed signal Ve, and the speed signal Ve is further differentiated with respect to time by a differentiator 238 to obtain an acceleration signal Ae.

A threshold determination unit 231 switches a selector switch 235 from N to Y when the acceleration signal Ae is a threshold or less. As a result, a brake signal B, which is obtained by multiplying the speed signal Ve by a correction coefficient B 232, is generated, and the brake signal B (second correction signal) is subtracted from the filtered position signal Pf.

The threshold determination unit 231 switches the selector switch 235 from Y to N when the acceleration signal Ae is larger than the threshold. As a result, the brake signal B is set to 0.

A threshold determination unit 234 switches a selector switch 237 from N to Y when the acceleration signal Ae is a threshold or more. As a result, an assist signal A, which is obtained by multiplying the speed signal Ve by a correction coefficient A 233, is generated, and the assist signal A (first correction signal) is added to the filtered position signal Pf.

The threshold determination unit 234 switches the selector switch 237 from Y to N when the acceleration signal Ae is smaller than the threshold. As a result, the assist signal A is set to 0.

Through the above-mentioned signal processing, the position computation block 8 reduces a reaction force, which is generated by driving the operation unit, to the operating force when the displacement of the operation unit is significantly accelerated, and generates the speed control signal so as to increase the reaction force when the displacement of the operation unit is significantly decelerated.

Figure 7C:
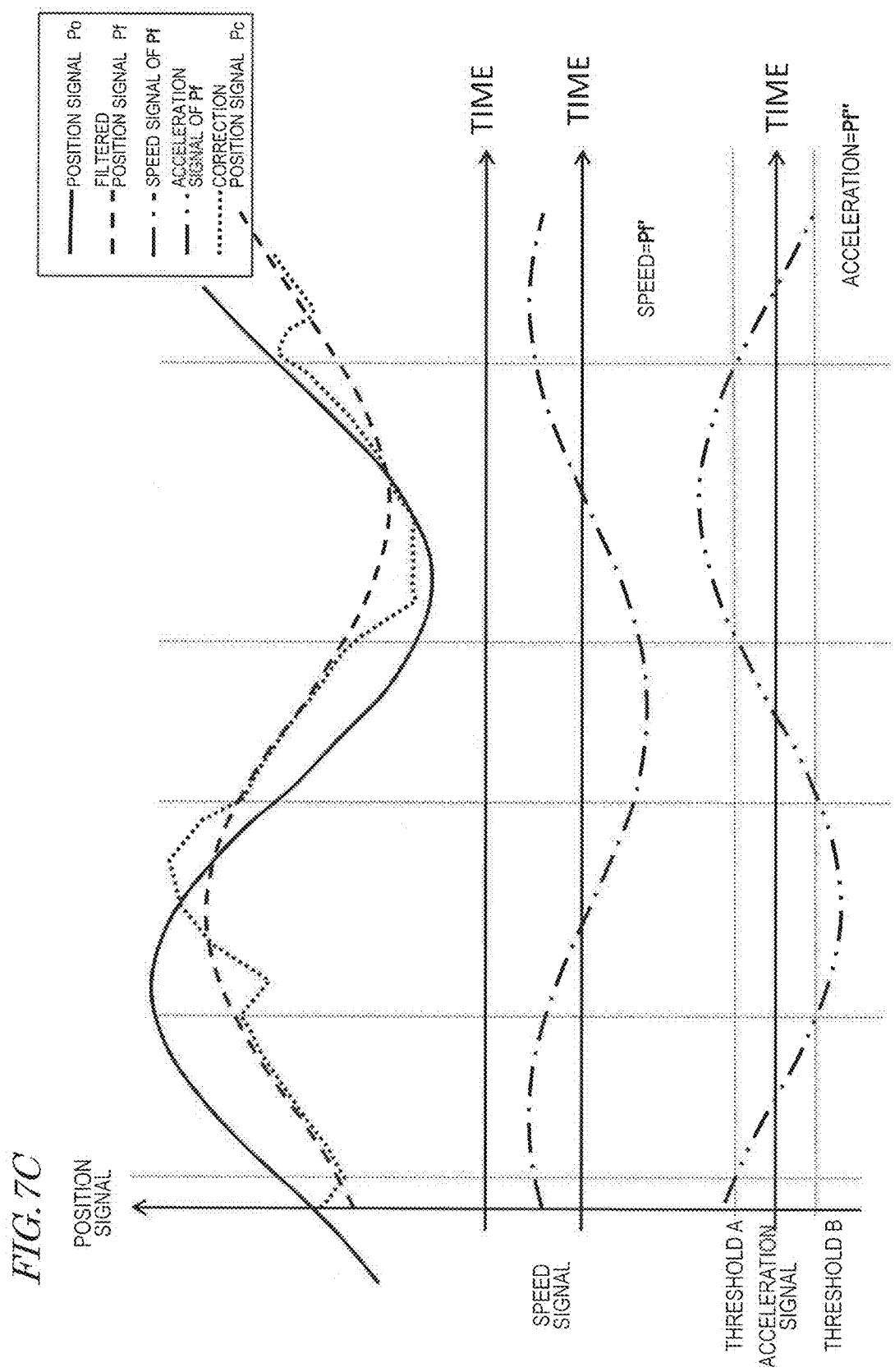
FIG. 7C is a graph for showing a position signal Po, a correction position signal Pc, a filtered position signal Pf, and speed and acceleration signals of the filtered position signal Pf in the input/output operation device illustrated in FIG. 7B.

In FIG. 7C, the position signal Po, the filtered position signal Pf, the speed signal Ve and the acceleration signal Ae of the filtered position signal Pf, and the correction position signal Pc are shown. When the acceleration signal Ae is a threshold A or more or a threshold B or less, a signal obtained by multiplying the speed signal Ve by the correction coefficient A 233 or the correction coefficient B 232 is superimposed on the filtered position signal Pf to generate the correction position signal Pc. When the acceleration signal Ae is the threshold B or less, the operator feels the reaction force as a sensation of braking. The reaction force is reduced when the acceleration signal Ae is the threshold A or more, and hence the reaction force is weakened. Therefore, a ragged tactile sensation can be applied as the load to the operator.

Seventh Embodiment

Figure 8A:
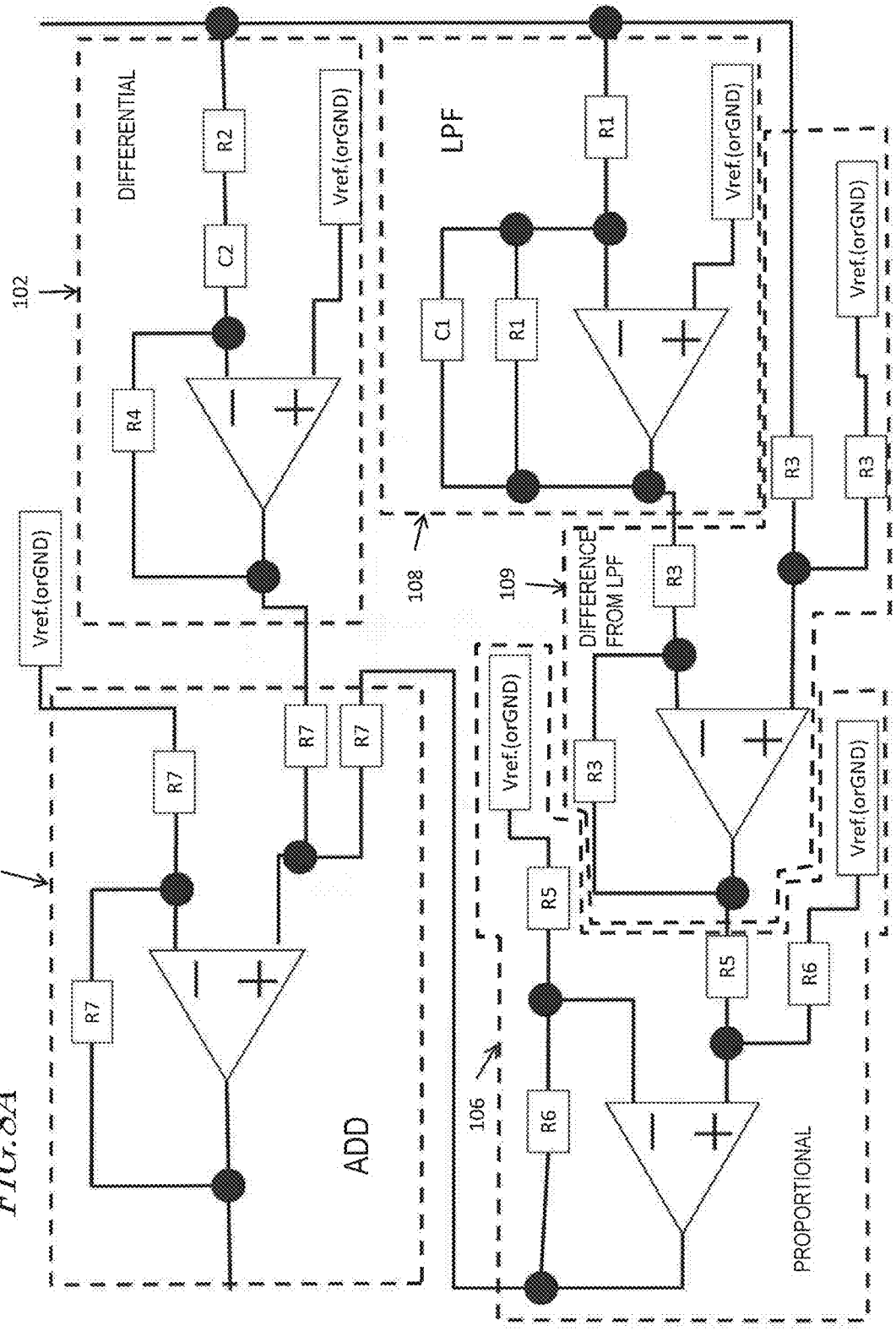
FIG. 8A is a diagram for illustrating another configuration example of a position computation block and a drive computation block of an input/output operation device according to a seventh embodiment of this disclosure.

The input/output device according to each of the first to sixth embodiments includes the arithmetic unit, the memory, and the control circuit 5 executed as a software program stored in the memory. However, the position computation block 8 and the drive computation block 9 of the control circuit 5 may be formed of an electronic circuit. For example, in the input/output device illustrated in FIG. 2D, each of the differential operation element 102, the low-pass filter 108, the subtractor 109, the proportional operation element 106, and the adder 110 may include an operational amplifier, a resistor, and a capacitor as illustrated in FIG. 8A.

Figure 8B:
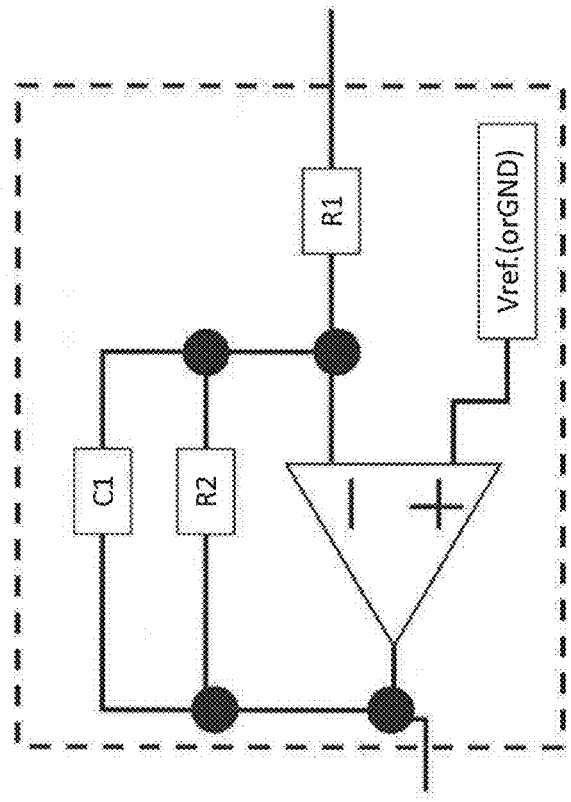
FIG. 8B is a diagram for illustrating another configuration example of an integral operation element.

In addition, the integral operation element 111 illustrated in FIG. 2M may include an operational amplifier, resistors, and a capacitor as illustrated in FIG. 8B.

INDUSTRIAL APPLICABILITY

The input/output operation device according to this disclosure is suitably used as an input device capable of presenting a tactile sensation in a variety of fields.

REFERENCE SIGNS LIST 1 actuator
2 operation unit
2' permanent magnet
3 position detector
4 electromagnetic coil
5 microcontroller
5' central processing unit
6 A/D converter
7 storage unit
8 position computation block
9 drive computation block
10 drive output circuit
11 amplifier
12 operating force

The invention claimed is:

1. An input/output operation device, comprising:
an operation unit, which is operated by an operator;
a detection unit, which detects a position of the operation unit to generate a position signal corresponding to the position of the operation unit;
a control circuit, which receives the position signal to generate a speed control signal; and
a drive circuit, which receives the speed control signal to drive the operation unit,
wherein the control circuit:
(a) causes the position signal to pass through a first filter circuit, which has a first lower cutoff frequency, to generate a speed signal;
(b) causes the position signal to pass through a second filter circuit, which has a second lower cutoff frequency being lower than the first lower cutoff frequency, to generate a correction signal; and
(c) adds at least the speed signal and the correction signal together to generate the speed control signal.

2. The input/output operation device of claim 1, wherein the first filter circuit and the second filter circuit sample the position signal with a predetermined sampling period, and
wherein the predetermined sampling period of the first filter circuit is shorter than the predetermined sampling period of the second filter circuit.

3. The input/output operation device of claim 1, wherein the first filter circuit subjects the position signal to differential operation,
wherein the second filter circuit causes the position signal to pass through a low-pass filter to generate a filtered position signal, and
wherein the control circuit subtracts a correction position signal, which is generated depending on the filtered position signal, from the position signal that has been subjected to the differentiation operation.

4. The input/output operation device of claim 3, wherein the second filter circuit subtracts an offset signal, which has a constant value within a predetermined time period, from the position signal or the filtered position signal.

5. The input/output operation device of claim 1, wherein the control circuit subtracts an offset signal, which has a constant value within a predetermined time period, from a signal obtained by causing the position signal to pass through the second filter circuit.

6. The input/output operation device of claim 4, wherein the constant value of the offset signal is set to a value of the position signal corresponding to a movable operation range of the operation unit.

7. The input/output operation device of claim 1, wherein the second lower cutoff frequency is set depending on a speed corresponding to the speed signal, which is generated by causing the position signal to pass through the first filter circuit.

8. The input/output operation device of claim 7, wherein the second lower cutoff frequency is set to become smaller as the speed corresponding to the speed signal, which is generated by causing the position signal to pass through the first filter circuit, becomes higher.

9. The input/output operation device of claim 1, wherein the second lower cutoff frequency is set depending on the position signal.

10. The input/output operation device of claim 1, wherein the control circuit further subjects a signal obtained by causing the position signal to pass through the first filter circuit to proportional operation or PI operation to generate the speed signal.

11. The input/output operation device of claim 1, wherein the control circuit further subjects a signal obtained by causing the position signal to pass through the second filter circuit to proportional operation or PI operation to generate the correction signal.

12. The input/output operation device of claim 1, wherein the control circuit generates the speed control signal for driving the operation unit in a direction opposite to a direction in which the operation unit is displaced.

13. The input/output operation device of claim 1, wherein the control circuit generates the speed control signal for driving the operation unit in the same direction as a direction in which the operation unit is displaced.

14. The input/output operation device of claim 3, wherein the correction position signal comprises the filtered position signal.

15. The input/output operation device of claim 3, wherein the correction position signal is generated by performing discretization operation on the filtered position signal, which is obtained by filtering the position signal.

16. The input/output operation device of claim 11, wherein the proportional operation comprises performing proportional operation on a signal obtained by subtracting, from the position signal, a signal obtained by causing the position signal to pass through the second filter circuit, to generate the correction signal, the proportional operation using, as a proportional coefficient, a signal obtained by subjecting, to split operation, the signal obtained by causing the position signal to pass through the second filter circuit.

17. The input/output operation device of claim 3, wherein the correction position signal is generated by selecting the filtered position signal, which is obtained by filtering the position signal, at predetermined distance intervals to set a target point, and holding the target point for a predetermined time period.

18. The input/output operation device of claim 3, wherein the correction position signal is obtained by:
   determining a filtered speed signal, which is obtained by subjecting the filtered position signal, which is obtained by filtering the position signal, to differential operation, and an acceleration signal, which is obtained by subjecting the filtered speed signal to differential operation;
   adding, when the acceleration signal is a first threshold or more, and when the filtered speed signal is a second threshold or more, a first correction signal to the filtered position signal, which is obtained by filtering the position signal; and
   subtracting, when the acceleration signal is a third threshold or less, a second correction signal from the filtered position signal.

19. The input/output operation device of claim 1,
   wherein the control circuit comprises an arithmetic unit, a memory, and a program, which is stored in the memory and is executable by the arithmetic unit, and
   wherein the arithmetic unit executes the program to perform (a) generation of the speed signal, (b) generation of the correction signal, and (c) generation of the speed control signal.

20. The input/output operation device of claim 1, wherein the control circuit comprises an analog circuit including an operational amplifier, a resistor, and a capacitor.

* * * * *